(12) United States Patent
Ketari

(10) Patent No.: US 8,115,609 B2
(45) Date of Patent: Feb. 14, 2012

(54) MULTI FUNCTION BLUETOOTH APPARATUS

(76) Inventor: Nissaf Ketari, Tunis (TN)

( * ) Notice: Subject to any disclaimer, the term of this patent is extended or adjusted under 35 U.S.C. 154(b) by 875 days.

(21) Appl. No.: 12/177,524

(22) Filed: Jul. 22, 2008

(65) Prior Publication Data

US 2011/0169654 A1 Jul. 14, 2011

(51) Int. Cl.
*B60R 25/10* (2006.01)
*B60Q 1/00* (2006.01)

(52) U.S. Cl. ............. 340/426.16; 340/426.24; 340/438; 340/539.11

(58) Field of Classification Search .. 340/539.1–539.15, 340/539.21, 539.23, 572.1, 426.16, 426.24–426.29, 340/426.3, 438; 455/41.2, 41.3, 567, 575.1; 704/3, 275
See application file for complete search history.

(56) References Cited

U.S. PATENT DOCUMENTS

| 6,885,848 | B2 * | 4/2005 | Lee ............................... 455/41.2 |
| 6,898,445 | B2 * | 5/2005 | Slettengren et al. .......... 455/567 |
| 7,565,132 | B2 * | 7/2009 | Ben Ayed .................. 455/404.1 |
| 7,778,186 | B2 * | 8/2010 | Oman et al. .................. 340/5.61 |
| 7,973,657 | B2 * | 7/2011 | Ayed ........................ 340/539.23 |
| 2002/0169977 | A1 * | 11/2002 | Chmaytelli ................... 713/200 |
| 2009/0017881 | A1 * | 1/2009 | Madrigal ................... 455/575.1 |
| 2009/0099836 | A1 * | 4/2009 | Jacobsen et al. .................. 704/3 |

* cited by examiner

*Primary Examiner* — Van T. Trieu
(74) *Attorney, Agent, or Firm* — Daniel Schein, Esq.

(57) ABSTRACT

A method and apparatus for secure access to data, to application and to systems and for providing an alarm to users upon detecting that a monitored device is not within a desired proximity using a multi-function BLUETOOTH apparatus are described. The multi-function BLUETOOTH apparatus can also provide voice and location functionality.

5 Claims, 16 Drawing Sheets

MULTI FUNCTION BLUETOOTH APPARATUS

FIELD OF THE INVENTION

The present inventions relate to Bluetooth key chain and more specifically relates to a multi-function Bluetooth key chain device.

BACKGROUND

More and more personal data is being stored on ever smaller and more mobile devices. The risk that sensitive data regarding identity, access codes, or business information could be compromised if one of these devices is misplaced increases with the amount of information that can be stored on them and their increasingly pervasive use. Requiring the entry of security codes or keys is a partial solution, but the efficacy of this solution decreases to the extent that the data onboard the device can be used if the mobile device lands in the wrong hands.

Portable electronic devices such as cellular telephones, personal digital assistants (PDAs), wireless email devices, instant messaging devices, pagers, portable compact disk (CD) players, portable MP3 players, and others are often forgotten, lost, or stolen (a "PED" includes any portable device that can be used for communication, performing intellectual and/or physical work, and/or entertainment).

Current data protection solutions consist of:
Password authentication,
User passwords are generally short and can be bypassed by reinstalling the operating system or the application. Passwords can be hacked through several methods including guessing, observation, and Trojan Horses (A virus in which malicious or harmful code is contained inside apparently harmless programming or data).
File encryption and decryption on entry of a password,
Some market available applications allow the user to define a password and to select an encryption method and an encryption key length. This application generally does a bulk encryption on saving and a decryption on user opening a file. This method requires sending a key to users, and often allows sharing of keys between users. If the key falls in the wrong hands, the data is compromised. Furthermore, if the key is lost, the data often cannot be accessed.
File decryption,
Some applications decrypt files when the user requests access for those files. These applications maintain the decryption key in memory during all user session, thus making it vulnerable to hackers. Furthermore, these applications decrypt a full file, and if the file size exceeds the available memory, the decrypted file is written to the hard drive, thus making it vulnerable to hacking.
SECUREID code for access to network,
SECUREID is cumbersome and inconvenient for the user. SECUREID is good at protecting a server from unauthorized access, and at validating users over a network. However, it fails to work in un-networked environment, and can have response latency.
USB dongle,
USB dongle is used to authenticate a user through the presence of a hardware device with a specific ID. USB dongles can be duplicated by experts.
PCs software like LOCKITNOW™ provides the ability to pair a computer with a mobile phone, and have the Windows login unlock when the user is in proximity and lock when the user is out of proximity.
RFID Key
Some high end cars provide RFID keys for contactless door access and engine start.

Another method for protecting data onboard a personal electronic device (PED) is disclosed in US patent application 0060199538, titled: Automatic data encryption and access control based on BLUETOOTH apparatus proximity which decrypts data on contact with a paired BLUETOOTH apparatus, and encrypts the data on loss of contact. This method is inefficient, can cause data corruption, and more importantly, it does not provide high level security. The Bluetooth ID of paired BLUETOOTH apparatus can be obtained from the operating system, and can be used to fake the BLUETOOTH apparatus.

It is noted that PED can refer to a computer, a mobile phone, a handheld device, an information system, a vehicle electronic computer, or any electronic system.

US Patent application publication 20050280546 discloses two mobile transceivers that are linked through a BLUETOOTH link. The BLUETOOTH enabled RF link between the first and second mobile transceiver units forms a monitoring piconet. The second mobile transceiver unit provides an alarm indication when the first mobile transceiver unit moves beyond a distance of approximately ten meters from the second mobile transceiver unit. The second device repeatedly pages the first device, and waits for a response. If a response is not received, an alarm is issued. This method has been tested and found to be unreliable due to high energy consumption and due to the human body blocking Bluetooth signals.

U.S. Pat. No. 6,885,848 is directed to an apparatus for preventing the loss of a portable telephone that uses BLUETOOTH communication protocol. The signal strength is periodically monitored and an alarm issued to the headphone when the signal is below a threshold. BLUETOOTH protocol provides for a received signal strength indicator (RSSI) value or the Link Quality value to be determined at any time. If the value received is below a threshold, an alarm is issued to the headphone. This system may reduce the chance that a portable telephone is lost or stolen, but if the mobile phone falls in the wrong hands, this system does not prevent the data from being accessed.

Thus, a need exists for a method and apparatus for secure access to data, to application and to systems and for providing an alarm to users upon detecting that a monitored device is not within a desired proximity. Such systems should also provide voice and location functionality.

SUMMARY OF THE INVENTION

A unitary apparatus, comprising:
a single transceiver selected from the set comprising a BLUETOOTH or Wibree transceiver, a power input;
wherein said single transceiver can pair with a second apparatus in a first range,
wherein on event selected from the set comprising:
user activates said unitary apparatus,
a message is received wirelessly from said second apparatus,
said single transceiver establishes a secure two-way wireless connection with said second apparatus,
wherein upon said single transceiver detecting a connection drop from said second apparatus to which said single transceiver has formed a pair,
said single transceiver periodically attempts to reconnect to said second apparatus.

A method for wirelessly monitoring a personal electronic device using a unitary apparatus comprising a single transceiver, comprising:
pairing said unitary apparatus with said personal electronic device in a first range,
said single transceiver onboard said unitary apparatus is selected from the set comprising a BLUETOOTH and a Wibree transceiver,
establishing a secure two-way wireless connection with said personal electronic device, upon said unitary apparatus detecting a connection drop from said personal electronic device to which said unitary apparatus has formed a pair,
said unitary apparatus periodically attempts to reconnect to said personal electronic device.
A method for authorizing user access comprising:
pairing with a unitary apparatus containing a single transceiver in a first range,
said single transceiver is selected from the set comprising a BLUETOOTH and a Wibree transceiver,
on user performing actions selected from the set comprising:
activate a personal electronic device,
launch an application onboard a personal electronic device,
push a button onboard a personal electronic device,
activate a switch onboard a personal electronic device,
touch a screen onboard a personal electronic device,
open a file onboard a personal electronic device,
access data onboard a personal electronic device,
pull a door handle, push an engine start button,
push a safety lock, push a trigger, pull a trigger,
wirelessly authenticating said unitary apparatus,
whereby said wireless authentication comprises:
establishing a secure two-way wireless connection between a personal electronic device and said unitary apparatus,
paging said unitary apparatus and receiving a response,
performing a Bluetooth inquiry and verifying said unitary apparatus responds,
verifying said unitary apparatus is within vicinity,
requesting a digital key from said unitary apparatus and verifying said digital key is valid,
requesting a digital key from said unitary apparatus and verifying said digital key matches a private key,
on successful authentication,
performing actions selected from the set comprising:
enable user access, decrypt file, launch application,
unlock phone, unlock screen, unlock file, unlock door,
activate a mechanical apparatus,
unlock a mechanical apparatus,
trigger a mechanical apparatus,
start engine, activate a relay.

BRIEF DESCRIPTION OF THE FIGURES

The present inventions may be more clearly understood by referring to the following figures and further details of the inventions that follow.

Similar reference numerals are used in different figures to denote similar components.

FURTHER DETAILS OF THE INVENTIONS

Figure 1A:
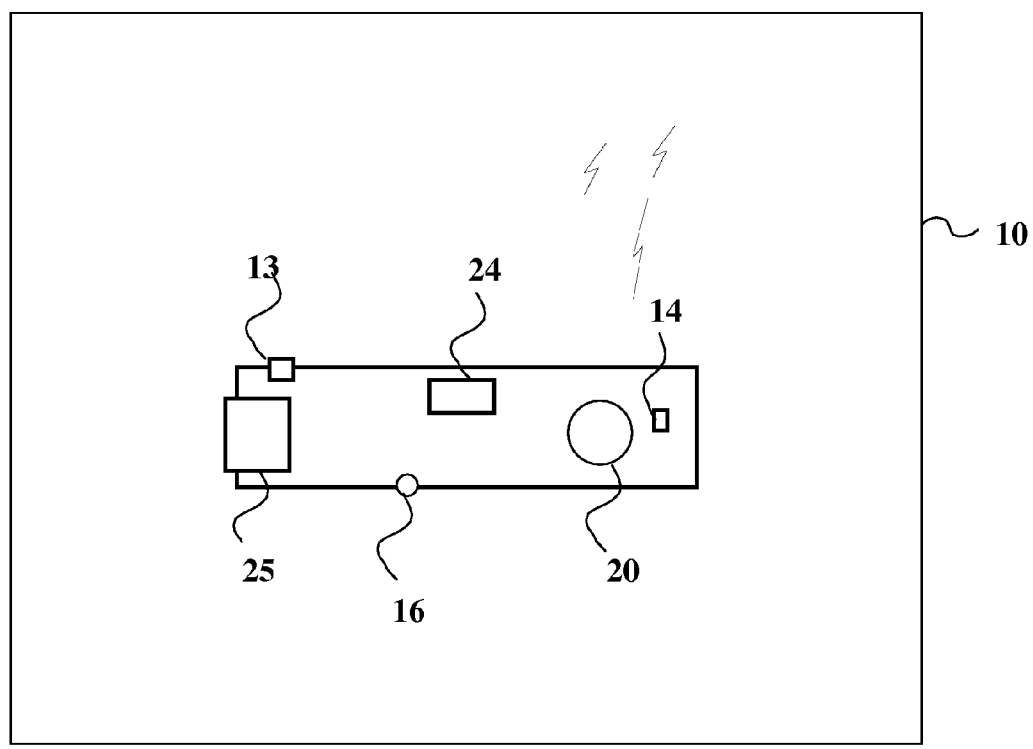
FIG. 1A is a schematic of a multi-function BLUETOOTH apparatus.

The following provides further details of the present inventions summarized above and illustrated in a schematic fashion in the Figures. In accordance with a first aspect of the present inventions, FIG. 1A is a schematic illustration of a multi-function BLUETOOTH apparatus (MFBA) 10 comprising a BLUETOOTH system 20 operatively connected with at least one activation switch 13, a visual indication center (or display) 16, a power store 24, a communication center 25 and an antenna 14. Display 16 can be used to indicate the status of the device, such as whether it is powered, if the BLUETOOTH transceiver system (BT) is discoverable or non-discoverable, if the BT is pairing or paired with another BT, the BT mode, inter alia.

In a preferred embodiment, the components of the MFBA 10 can fit in a volume less about 60×30×10 mm or 18 cc, so that MFBA 10 can fit into a housing having an interior with dimensions of 60×30×10 mm or no more than 18 cc. In another embodiment, MFBA 10 can fit into a volume 10 cc, and weigh about 50 grams or less, and preferably less than about 10 g. Devices of the present invention should take up minimal volume and be light weight. For example, each device of the present inventions will preferably fit into a space having a volume of 56 cubic centimeters, 25 cubic centimeters, 22.5 cubic centimeters, 18 cubic centimeters, 10 cubic centimeters, or 1 cubic centimeters, and each device of the present inventions preferably has a weight less than about 200 grams, less than about 50 grams, or less than about 10 grams.

An attachment mechanism or system, including but not limited to a hook, harness, notebook security lock, insert, pin, clip, badge, clip, key chain, car key, firearm activation key, ring, tee, dog collar, Velcro, ring, fastening mechanism, sticky surface are optionally attached to MFBA 10.

Control or activation switches 13 can be any type of button, switch, remote sensor, touch sensor, contact sensor, bio sensor, key pad to enter password or activation system. Activation switches 13 are used to turn the MFBA 10 ON/OFF, to shut off the alarm of communication center 25. For example, a single control button can cycle through a menu of functions by changing the length of time that the button is held and/or the speed with which a first press is followed by a second press (analogous to the single and double click on a computer mouse). One or two control buttons coupled with a simple display screen can adjust a variety of operational parameters.

BLUETOOTH system 20 enables connectivity over the 2.4 GHz radio frequency (RF) band. BLUETOOTH system 20 includes a radio and base band IC for BLUETOOTH 2.4 GHz systems. In a preferred embodiment, BLUETOOTH system 20 includes ROM, Flash memory or external memory or any other type of memory. In an alternative embodiment, BLUETOOTH system 20 includes a power amplifier (PA) and/or low noise amplifier (LNA) for increasing the BLUETOOTH transmission range. In a preferred embodiment, BLUETOOTH system 20 includes a processor, RAM and Flash for loading and executing program. The processor executes the BLUETOOTH protocol, as well as the firmware that provides the proximity detection and alarming functionality. The processor can also executes other functionality such as sending files on pairing, flashing lights, providing voice functionality, relaying voice to a remote BLUETOOTH apparatus, detecting connection from a remote BLUETOOTH apparatus, etc.

The BLUETOOTH specification (a de facto standard containing information required to ensure that devices supporting BLUETOOTH can communicate with each other worldwide) defines two transmission ranges for personal area networking. The range is between 10 m and 100 m without a line of sight requirement. The radio link is capable of voice and data transmission up to a maximum capacity of 720 kbps per channel. Any other range can be designed.

A BLUETOOTH network is completely self organising, and ad hoc personal area networks (PANs) can be established wherever two or more BLUETOOTH apparatus are sufficiently close to establish radio contact. Equipment capable of BLUETOOTH connectivity is able to self-organise by automatically searching within range for other BLUETOOTH-enabled devices. Upon establishing a contact, information is exchanged which determines if the connection should be completed or not. During this first encounter, the BLUETOOTH apparatus connects via a process of authorisation and authentication.

BLUETOOTH Pairing happens when two BLUETOOTH enabled devices authenticate each other and agree to communicate with one another. When this happens, the two devices join what is can be referred to as a trusted pair. When one device recognizes another device in an established trusted pair, each device automatically accepts communication, bypassing the discovery and authentication process that normally happen during BLUETOOTH interactions. After pairing, each device may store the Bluetooth ID of the second device for future use.

When BLUETOOTH pairing is being set up, the following usually happens:
1. Device A (such as a handheld) searches for other BLUETOOTH enabled devices in the area.
   How does A find these devices? The devices that are found all have a setting that makes them discoverable when other BLUETOOTH apparatus search. It's like raising your hand in a classroom: the discoverable devices are announcing their willingness to communicate with other BLUETOOTH apparatus. By contrast, many BLUETOOTH apparatus can toggle their discoverability settings off. When discoverability is off, the device will not appear when other devices search for it. Undiscoverable devices can still communicate with other BLUETOOTH apparatus, but they must initiate all the communications themselves.
2. A detects Device B (such as a second handheld that's discoverable).

During the discovery process, the discoverable devices usually broadcast what they are (such as a printer, a PC, a mobile phone, a handheld, etc.), and their BLUETOOTH apparatus Name (such as "Bob's Laptop" or "deskjet995c"). Depending on the device, you may be able to change the Device Name to something more specific. If there are 10 BLUETOOTH laptops and 5 BLUETOOTH mobile phones in range, and they are all discoverable, this can come in handy when selecting a specific device.

3. A asks B to send a Passkey or PIN
   A passkey (or PIN) is a simple code shared by both devices to prove that both users agree to be part of the trusted pair. With devices that have a user interface, such as handhelds, mobile phones, and PCs, a participant must enter the passkey on the device. With other types of devices, such as printers and hands-free headsets, there is no interface for changing the passkey on the device, so the passkey is always the same (hard coded). A passkey used on most BLUETOOTH headsets is "0000". The passkeys from both parties must match.
4. A sends the passkey to B
   Once you've entered the passkey on A, it sends that passkey to B for comparison. If B is an advanced device that needs the user to enter the same passkey, it will ask for the passkey. If not, it will simply use its standard, unchanging passkey.
5. B sends passkey back to A
   If all goes well, and B's passkey is the same entered by A, a trusted pair is formed. This happens automatically when the passkeys agree. Once a trusted pair is developed, communication between the two devices should be relatively seamless, and shouldn't require the standard authentication process that occurs between two devices who are strangers. Embodiments of the present inventions take advantage of the reduced power requirements of certain BLUETOOTH modes following pairing of two BLUETOOTH enabled devices.

BLUETOOTH has several types:
i) Class 2: a class 2 BLUETOOTH transceiver can discover pair and communicate with any BLUETOOTH transceiver within a radius of 10 meters seamlessly.
ii) Class 1: A class 1 BLUETOOTH transceiver can discover pair and communicate with any BLUETOOTH transceiver within a radius of 100 meters.
iii) Class 3: A class 3 BLUETOOTH transceiver can discover pair and communicate with any BLUETOOTH transceiver within a radius of 2 meters.
iv) Non standard devices: can be designed to discover pair and communicate with any BLUETOOTH transceiver within any distance less than 300 meters.

Bluetooth inquiry procedure enables a device to discover which devices are in range, and determine the addresses and clocks for the devices. The inquiry procedure involves a unit sending out inquiry packets (inquiry state) and then receiving the inquiry reply. The unit that receives the inquiry packets (the destination), will hopefully be in the inquiry scan state to receive the inquiry packets. The destination will then enter the inquiry response state and send an inquiry reply to the source. After the inquiry procedure has completed, a connection can be established using the paging procedure.

Paging Procedure is used to communication with another device directly using a device Bluetooth address. Paging allows sending packets to a specific BLUETOOTH apparatus.

Power store 24 provides power to some of the components of MFBA 10. Power store 24 can be a capacitor, a battery (fuel cell, nickel-cadmium, lithium, lithium polymer, lithium ion, alkaline or nickel-hydride battery or any other portable source of electric power) or a combination of a capacitor and a battery, whereby the capacitor onboard a main unit is used to power BLUETOOTH system 20 for a number of utilizations and it can be charged from time to time by attaching the main unit to a detachable battery unit. Power store 24 can also be replaced with photovoltaic cells, a rechargeable battery, or a battery rechargeable from a distance (such as by induction). When MFBA 10 is not in operation it remains in a dormant state ("sleep-mode") to conserve the energy of power store 24. For example, small 1.5 volt batteries, and the like, such as those used in small devices like hearing aids, calculators and watches are widely available and can be used as for a power source. One of ordinary skill in the art can readily determine the battery size and power requirements for different embodiments of the present inventions. It is envisioned that other low power specifications can be used in connection with the present inventions. For example, an ultra-low-power wireless technology called Wibree has been developed. Wibree addresses devices with very low battery capacity and can be easily integrated with BLUETOOTH technology.

Visual indication center 16 comprises one or more LED. The LED can turn on and off periodically to indicate the system is on. The color and frequency of the LEDs can indicate different events such as normal mode, pairing mode, alarm mode, low battery mode, voice mode, etc In a preferred embodiment, visual indication center 16 while indicating the status of the system also illuminates a customizable face plate, made out of clear material such as acrylic. A logo or graphic can be printed on the face plate thus allowing to easily and economically change the look and branding of the device. This automatically leverages the visual indication center, and adds a promotional value and function to the device, above and beyond the main functions.

In another embodiment, visual indication center 16 can be an LCD or any other indication means, and communication center 25 includes an alarm audible from a distance greater than 6 feet. A regular alarm is between 65 and 120 decibels at 10 feet. Noise levels above 85 decibels can harm hearing over time. Noise levels above 140 decibels can cause damage to hearing after just one exposure. In a preferred embodiment, communication center 25 has more than 50 decibels or 50 dBA at 10 feet or exceeds ambient sound level by 5 decibels minimum. In a preferred embodiment, the alarm provides an audible signal of at least 60 decibels at 10 cm to notify the user of a designated event, such as a laptop or phone left behind. The human ear does not respond equally to all frequencies: humans are much more sensitive to sounds in the frequency range about 1 kHz to 4 kHz (1000 to 4000 vibrations per second) than to very low or high frequency sounds. Sound meters are usually fitted with a filter that has a frequency response similar to the human ear. If the "A weighting filter" is used, the sound pressure level is given in units of dB(A) or dBA. In residential areas, most noise comes from transportation, construction, industrial, and human and animal sources. Road traffic noise is the leading source of community noise. The noise can be highly variable. It is common that Day-Night sound levels in different areas vary over a range of 50 dB. The outdoor level in a wilderness area may occur as low as 30 to 40 dBA, and as high as 85-90 dBA in an urban area. Most urban dwellers lives in areas of noise level more than 48 dBA.

Communication center 25 can be any type of audio, video, tactile or mechanical interface means capable of conveying information to the user. Communication center 25 can also be any type of data port, connector, USB connector, mini USB connector for exchanging information with a personal computer. In another preferred embodiment, communication center 25 is used to flash one or more digital keys or a program onto MFBA 10. Flash or flashing is a process for writing data to flash memory. A commonly used process to flash BLUETOOTH apparatus consists of: using SPI (Serial Programming Interface) protocol and sending/receiving data to BLUETOOTH apparatus through 4 connections: MOSI, MISO, CLK, CSB. The 4 connections (and GND) can be tied directly to 5 ports on the LPT port. Alternatively, the 4 connections are tied to ports onboard a USB to SPI converter, and the USB to SPI converter is connected to USB port onboard the personal computer. A flashing program runs on PED, and sends flashing instructions to either BLUETOOTH chipset directly through SPI protocol, or to USB to SPI converter which in turns sends flashing instructions to BLUETOOTH chipset through SPI protocol. SPI flashing allows to load a new program or to change parameters.

In another preferred embodiment, communication center 25 is used to flash private information such as passwords for different web sites, data bases, computers, etc and associated information onto MFBA 10. Audio means can be any audio device such as a speaker, a buzzer, a Piezo buzzer, omni-directional speaker, directional speaker, an ultrasound or any other audio device. Visual means can be an LED, or any visual information display device. Tactile means can be any tactile sensor such as a vibrator, or a heat-generating device.

Antenna 14 can be any type of antenna including chip antenna, patch antenna, PCB antenna and dipole antennas.

In another embodiment, antenna 14 is not installed.

In an embodiment, MFBA 10 can be inserted beneath the skin or included inside the housing of objects such as portable computers or RFID badges. It can also be carried as a keychain or attached to people or objects through a hook, harness, notebook security lock, insert, pin, clip, badge, access card, clip, key chain, car key, firearm activation key, ring, tee, dog collar, Velcro fastener, ring, fastening mechanism, sticky or adhesive surface or any other attachment mechanism. Many notebook computers have a security slot on the side, which can be utilized by inserting a notebook security lock; the lock can be attached to an external device, such as a cable or desktop securing mechanism.

MFBA 10 can also be encased in waterproof packaging and attached to clothes. The packaging can also be shock or impact resistant. System 10 can be incorporated in any other plastic or portable electronic device or object, including for example a cell phone, PDA, a wireless email device, an instant messaging device or pager, a portable computer, an MP3 player, a portable music player, a portable radio device, or any portable electronic device. Preferably, MFBA 10 has dimensions of less than 10 cm×10 cm×5 cm (otherwise stated as "10×10×10 cm") and is less than 200 g in weight. In an embodiment, there are no manually operated controls (e.g., off-on or activation button is magnetically operated, so the housing is not provided with button or switch access), and the device may not have a display. In an embodiment, the housing of the device includes at least one seal and/or is waterproof so that immersion in water, or preferably even running the device through laundering machines, does not damage the electronic components. In a preferred embodiment, system 10 has a size equal to or smaller than 5 cm×3 cm×1.5 cm or 22.5 cubic centimeters ("cc"). A device having the desired functions of the present inventions can fit all of its components into a volume less than 1000 cc, preferably less than about 56 cc, 22.5 cc, and even 10 cc. Each mobile proximity sensor or remote sensor weighs less than 200 grams, preferably less than 50 g, and even less than 10 g. A preferred device has no than four manually operated buttons or switches, and preferably has only one manually operated button or activation switch and no more than one display. Each mobile proximity sensor consumes less than 50 mA.

An embodiment of a remote sensor for attachment to or carrying by a person has no manually operated controls and no display; such an embodiment would be difficult to disable and particularly durable to operate under robust physical and environmental challenges. Such a device might be carried by soldiers and law enforcement personnel and have a beacon or alarm that is activated should the housing be broken.

Figure 1B:
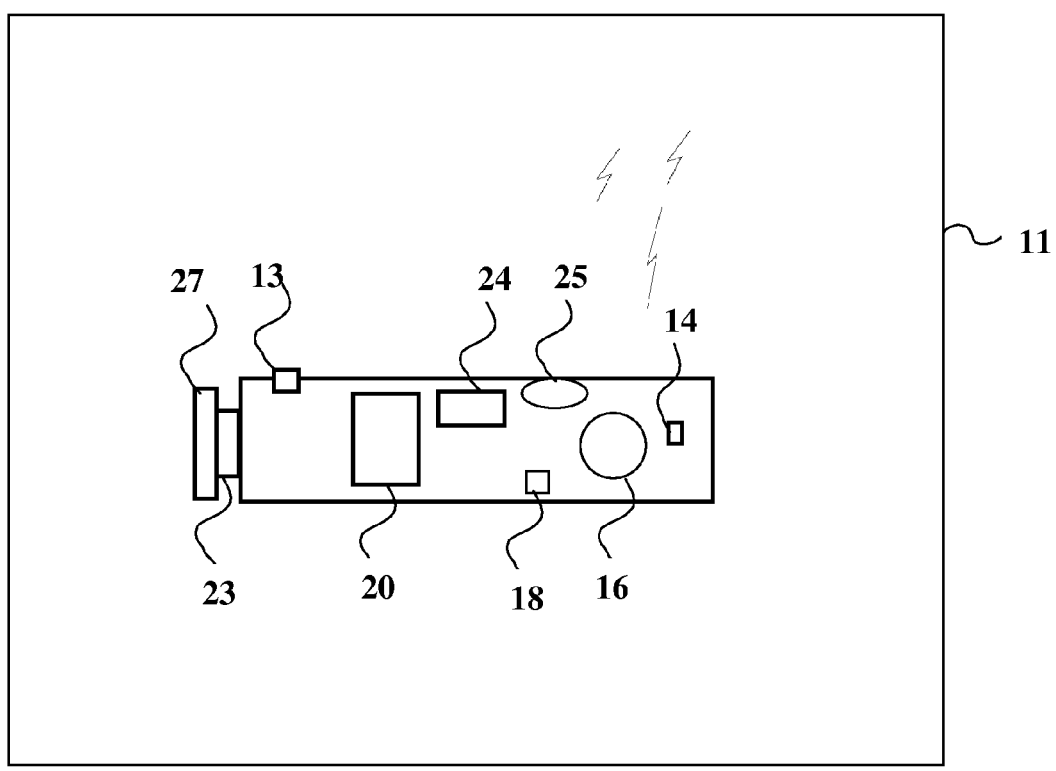
FIG. 1B is a schematic of an alternative multi-function BLUETOOTH apparatus.

FIG. 1B is a schematic of an alternative multi-function BLUETOOTH apparatus (MFBA) 11 comprising a BLUETOOTH system 20 connected with activation switches 13, visual indication center (or display) 16, power store 24, communication center 25, antenna 14, Audio center 18, bearing 23 and ear piece 27.

Audio center 18 can be any type of microphone, speaker, earphone wire, etc. In a preferred embodiment, the electronic components of MFBA 11 can be fit into a volume of about 60×30×10 mm or 18 cc or less. For example, MFBA 11 may be fit into a volume less than about 56 cc, 22.5 cc, 18 cc or 10 cc. Ear piece 27 is an earphone or speaker that fits in the ear. Bearing 23 can be a pivot, articulation, U joint or a ball joint. Bearing 23 is generally mounted to earpiece 27 and allows adjusting the angle of ear piece 27 relative to the main body of MFBA 10 across one or more planes.

Figure 1C:
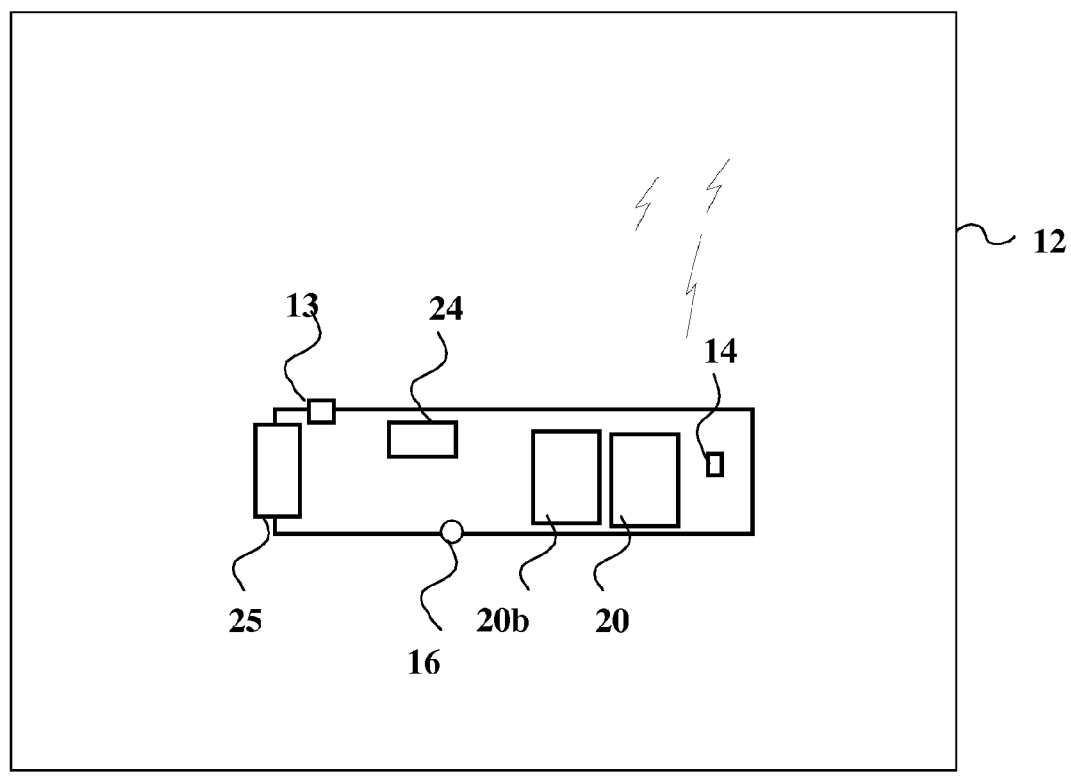
FIG. 1C is a schematic of an alternative multi-function BLUETOOTH apparatus.

FIG. 1C is a schematic of an alternative multi-function BLUETOOTH apparatus (MFBA) 12 comprising a BLUETOOTH system 20 connected with BLUETOOTH system 20b, activation switches 13, visual indication center (or display) 16, power store 24, communication center 25 and antenna 14. BLUETOOTH system 20b is similar to BLUETOOTH system 20, except that it may run a different BLUETOOTH profile. In a preferred embodiment, BLUETOOTH system 20b runs AGHFP profile.

Figure 2A:
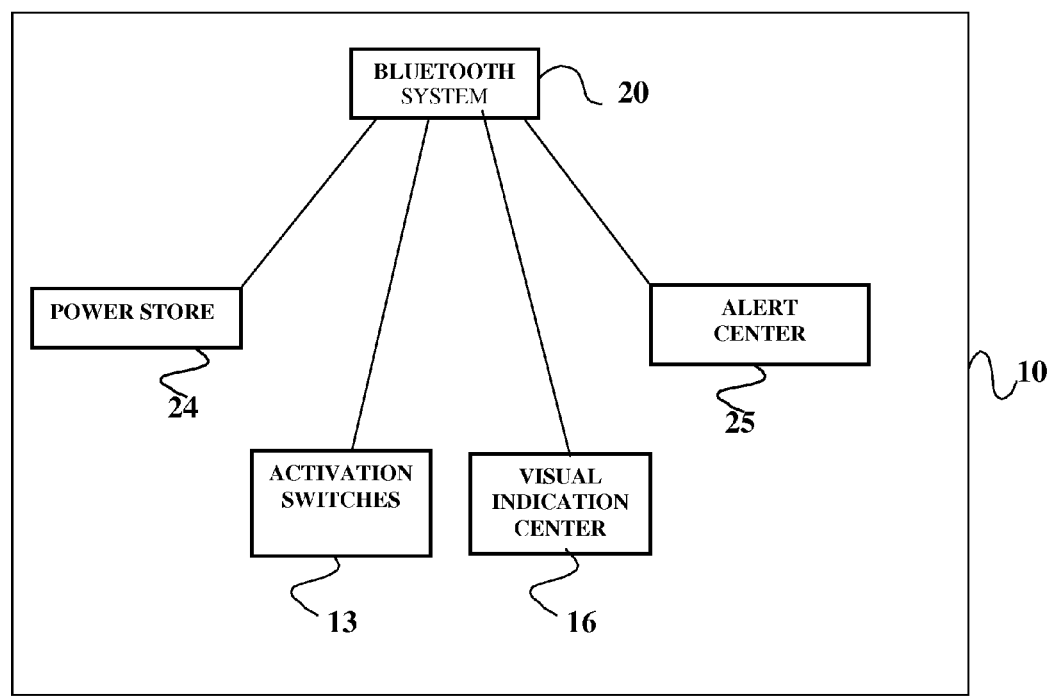
FIG. 2A is a block diagram of multi-function BLUETOOTH apparatus.

Referring to FIG. 2A, in an embodiment, MFBA 10 comprises a BLUETOOTH system 20 connected with activation switches 13, visual indication center 16, power store 24, and communication center 25.

Figure 2B:
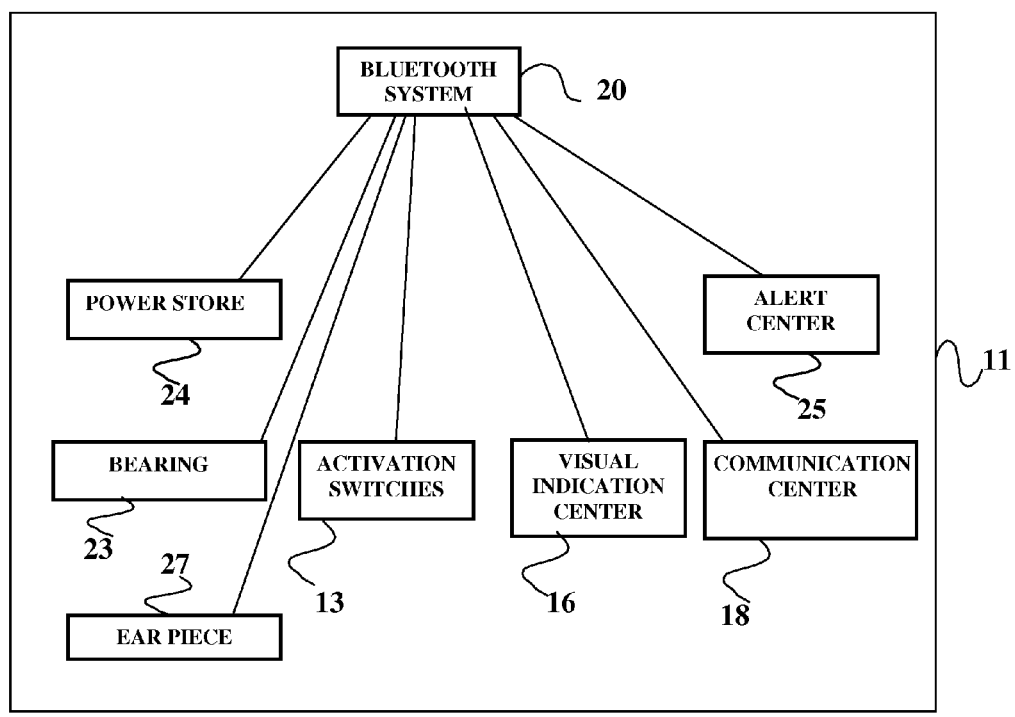
FIG. 2B is a block diagram of an alternative multi-function BLUETOOTH apparatus.

Referring to FIG. 2B, in an embodiment, MFBA 11 comprises a BLUETOOTH system 20 connected with activation switches 13, visual indication center 16, power store 24, communication center 25, audio center 18, bearing 23 and ear piece 27.

Referring to FIG. 2B, in an embodiment, MFBA 11 comprises a BLUETOOTH system 20 connected with activation switches 13, visual indication center 16, power store 24, alert center 25, audio center 18, bearing 23 and ear piece 27.

Figure 2C:
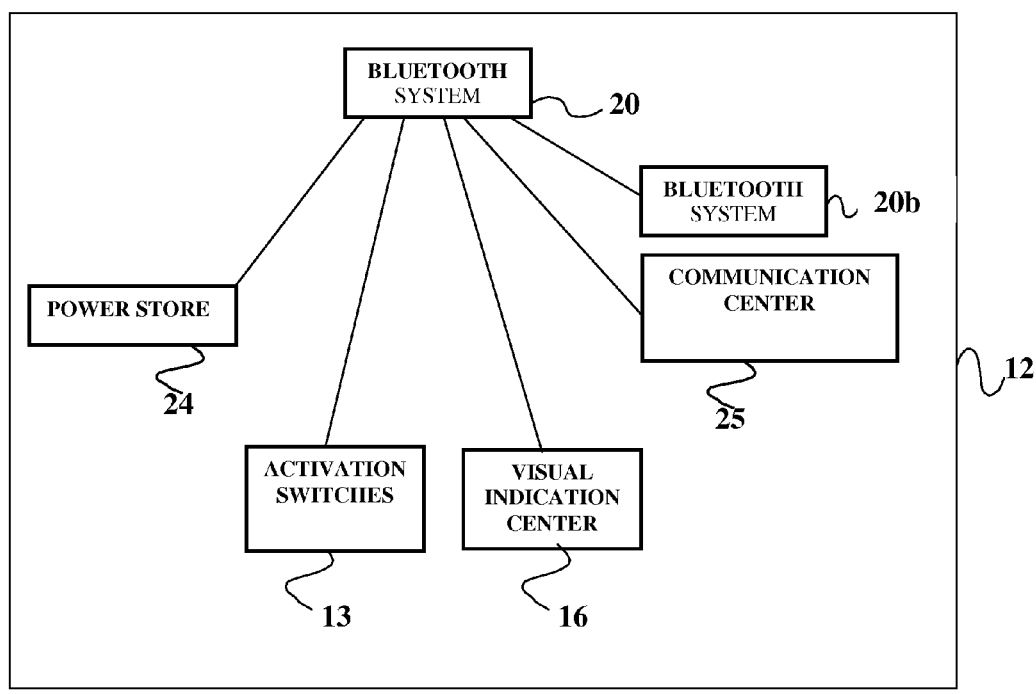
FIG. 2C is a block diagram of an alternative multi-function BLUETOOTH apparatus.

Referring to FIG. 2C, in an embodiment, MFBA 12 comprises a BLUETOOTH system 20 connected with BLUETOOTH system 20b, activation switches 13, visual indication center 16, power store 24, and communication center 25.

Figure 3A:
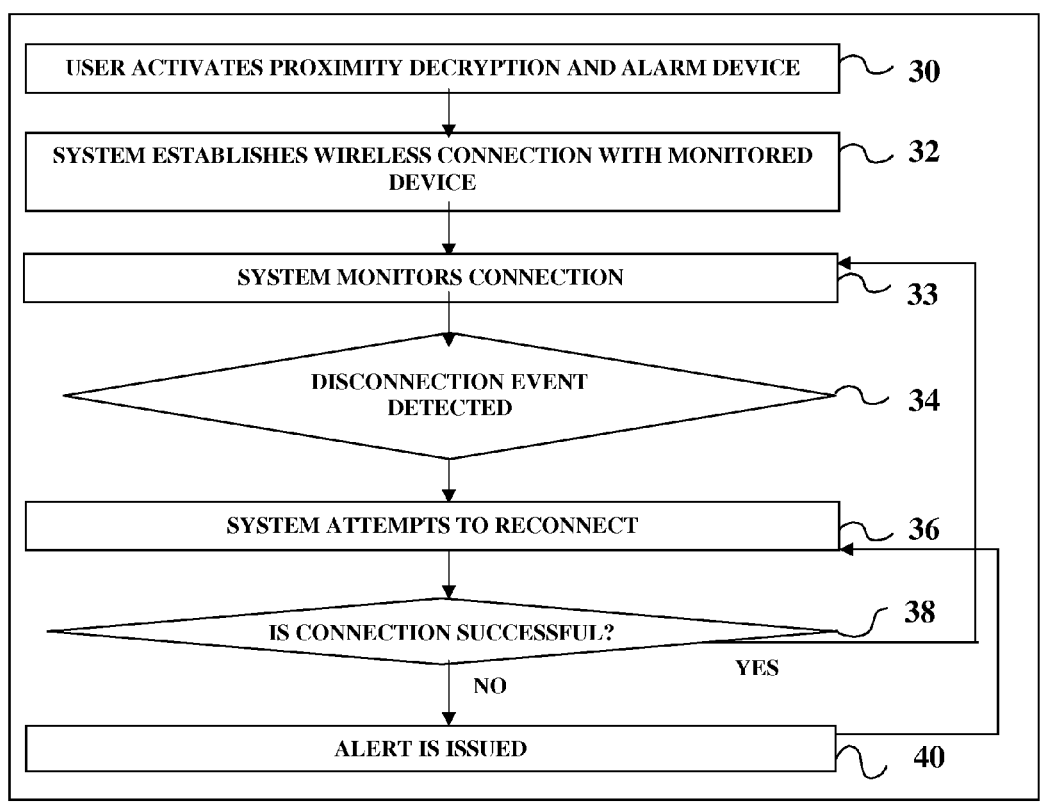
FIG. 3A is a flowchart illustrating the operation of a multi-function BLUETOOTH apparatus.

Turning now to FIG. 3A, the flowchart illustrates the steps involved in detecting that a portable electronic device (PED) is outside a desired range of a base device (a base device may be referred to as a master and the monitored remote devices referred to as slaves). The PED can be for example a mobile phone, a PDA, a wireless email device, an instant messaging device, a pager, a portable computer, an MP3 player, a portable music player, a portable radio, or any PED. In step 30, the user activates multi-function BLUETOOTH apparatus 10/11 by pressing activation switch or button 13.

Activation switch 13 has several modes. In a preferred mode, a long press of activation button 13 on the base unit 10 indicates ON/OFF event. A long press may be defined by either the length of time that switch 13 is manually held in a second position against a bias that holds the switch in a first position when at rest, or a signal may be given to indicate that a desired mode of operation or desired action has been initiated. For example, a very long press can cause a switch to pairing mode. In a preferred embodiment, a double click refers to a long pause.

In another embodiment, activation switch 13 button press can cause one or more messages to be automatically sent to a paired personal electronic device. An application/program running on said paired personal electronic device (PED) perform one or more actions in response to said messages. For example, on a button press, a password and an address (address can be a URL, a link, a phone number, a WAP address, an IP address, a file name . . . ) are automatically sent to PED, and a connection to the address is automatically established.

In another embodiment, when PED needs to authenticate the user, PED verifies that paired MFBA 10 is within proximity. PED can either try to establish a Bluetooth connection (HFP/SPP/HID . . . ), can page MFBA 10 and wait for a response, or can do an inquiry and verify that a response is received from paired MFBA 10. PED can also request a digital key from MFBA 10. If a positive response is received, user access to PED is authorized, and if not, user access is denied. For example, on user activating a mobile phone or a firearm device, the mobile phone will check that MFBA 10 is within proximity. If confirmed, the phone is unlocked and the user does not have to enter a password. Another example is on user pressing a keyboard key; the computer will check that MFBA 10 is within vicinity. If confirmed, the computer will automatically log the user in and the user does not have to enter a password in the Windows password screen. In this example, the wireless range of MFBA 10 may be reduced to minimum range. A Class 3 Bluetooth transceiver may be used or the antenna may be removed so that MFBA 10 has minimum range. If the computer finds more than one authorized user in its vicinity, the computer may ask the user for further authentication or challenge questions.

In another embodiment, a sensitive information application onboard mobile phone for example, checks that MFBA 10 is within proximity. If confirmed, the user is granted access to the application, or data can be decrypted.

In another embodiment, on user trying to access a protected address such as a URL or link, a protected file, an encrypted file, an encrypted record, or a protected database, an application/program running on said paired PED sends a message to said MFBA 10 requesting a digital key. The message may include an address for which a password is sought. Said MFBA 10 automatically sends said digital key. Said digital key may be input in the appropriate fields for authentication or decryption.

In step 32, unitary BLUETOOTH system 20 in a unitary base unit establishes a BLUETOOTH connection with a monitored remote device. The wireless connection can be a SPP (serial port profile) connection, HSP (headset profile) connection or a HFP (Hands-Free profile) connection. Other connection profiles that can be used include AGHFP (audio gateway HFP), RFCOMM, A2DP (advanced audio distribution profile), AVRCP (audio video remote control profile), AVCTP (audio video control transport protocol), AVDTP (audio video distribution transport protocol), DUN (dial up networking), and GAVDP (general audio video distribution profile).

In one embodiment, Messages between said MFBA 10 and said PED may be encrypted using regular encryption algorithms or using digital tones or any other encoding decoding method.

In one embodiment, BLUETOOTH system 20 does not redirect voice calls, thus the mobile phone operations remain intact. BLUETOOTH system 20 uses a BLUETOOTH operational mode that uses minimal power, e.g., one of sniff, hold, or park modes. In a preferred embodiment, only BLUETOOTH sniff mode is used after pairing to assure low power usage and optimize convenience to the user by reducing the frequency of battery recharging or replacement.

In sniff mode, a device listens only periodically during specific sniff slots, but retains synchronization with the paired BLUETOOTH apparatus onboard the monitored device. In other embodiments, BLUETOOTH system 20 can use hold mode wherein a device listens only to determine if it should become active, or park mode wherein a device transmits its address. Sniff mode assures very low power consumption and thus extends battery life. In sniff mode, a BLUETOOTH master radio frequency unit (e.g., base) addresses a slave radio frequency unit (e.g., remote), which enables the slave to synchronize to the master by sending poll packets and optionally null packets over an active link, the master being arranged so that receipt of a response from the slave unit to a poll packet is sufficient to maintain the active link. The slave unit does not have to respond to all poll packets. This approach can allow the slave to preserve more (transmit) power by going into a deep sleep mode in which a low power oscillator may be used while still allowing the master unit to detect whether the slave has resynchronized or not (and thus to update a Link Supervision Timer, for example).

BLUETOOTH Wireless Technology Profiles: In order to use BLUETOOTH wireless technology, a device must be able to interpret certain BLUETOOTH profiles. The profiles define the possible applications. BLUETOOTH profiles are general behaviors through which BLUETOOTH enabled devices communicate with other devices. BLUETOOTH technology defines a wide range of profiles that describe many different types of uses.

At a minimum, each profile specification contains information on (1) dependency on other profiles, (2) suggested user interface formats, and (3) specific parts of the BLUETOOTH protocol stack used by the profile. To perform its task, each profile uses particular options and parameters at each layer of the stack. This may include an outline of the required service record, if appropriate.

Serial Port Profile (SPP). SPP defines how to set-up virtual serial ports and connect two BLUETOOTH enabled devices. SPP is based on the ETSI TS07.10 specification and uses the RFCOMM protocol to provide serial-port emulation. SPP provides a wireless replacement for existing RS-232 based serial communications applications and control signals. SPP provides the basis for the DUN, FAX, HSP and LAN profiles. This profile supports a data rate up to 128 kbit/sec. SPP is dependent on GAP.

Object Push Profile (OPP). OPP defines how to push a file to a BLUETOOTH apparatus. When MFBA 10 is first paired with PED, MFBA 10 can automatically send a file to PED to install drivers and application program necessary for transferring messages and data between PDAP 10 and PED.

RFCOMM. The RFCOMM protocol emulates the serial cable line settings and status of an RS-232 serial port and is used for providing serial data transfer. RFCOMM connects to the lower layers of the BLUETOOTH protocol stack through the L2CAP layer. By providing serial-port emulation, RFCOMM supports legacy serial-port applications while also supporting the OBEX protocol among others. RFCOMM is a subset of the ETSI TS 07.10 standard, along with some BLUETOOTH-specific adaptations.

Hands-Free Profile (HFP). HFP describes how a device can be used to pair, to connect to an audio gateway such as a mobile phone, and to place and receive calls. A typical application is a BLUETOOTH headset device or a BLUETOOTH car kit. Hands-Free Audio Gateway Profile (AGHFP) describes how a gateway device such as a mobile phone can be used to pair, to connect and to send and receive calls to/from a hands-free device. A typical configuration is a mobile phone.

Headset Profile (HSP). The HSP describes how a BLUETOOTH enabled headset should communicate with a computer or other BLUETOOTH enabled device such as a mobile phone. When connected and configured, the headset can act as the remote device's audio input and output interface. The HSP relies on SCO for audio and a subset of AT commands from GSM 07.07 for minimal controls including the ability to ring, answer a call, hang up and adjust the volume.

Advanced Audio Distribution Profile (A2DP). A2DP describes how stereo quality audio can be streamed from a media source to a sink. The profile defines two roles of an audio source and sink. A typical usage scenario can be considered as the "walkman" class of media player. The audio source would be the music player and the audio sink is the wireless headset. A2DP defines the protocols and procedures that realize distribution of audio content of high-quality in mono or stereo on ACL channels.

The term "advanced audio", therefore, should be distinguished from "BLUETOOTH audio", which indicates distribution of narrow band voice on SCO channels as defined in the baseband specification.

Audio/Video Control Transport Protocol (AVCTP). AVCTP describes the transport mechanisms to exchange messages for controlling A/V devices.

Audio/Video Distribution Transport Protocol (AVDTP). AVDTP defines A/V stream negotiation, establishment and transmission procedures.

Audio/Video Remote Control Profile (AVRCP). AVRCP is designed to provide a standard interface to control TVs, hi-fi equipment, or other A/C equipment to allow a single remote control (or other device) to control all the A/V equipment that a user has access to. It may be used in concert with A2DP or VDP. AVRCP defines how to control characteristics of streaming media. This includes pausing, stopping and starting playback and volume control as well as other types of remote control operations. The AVRCP defines two roles, that of a controller and a target device. The controller is typically considered the remote control device while the target device is the one whose characteristics are being altered. In a "walkman" type media player scenario, the control device may be a headset that allows tracks to be skipped and the target device would be the actual medial player.

This protocol specifies the scope of the AV/C Digital Interface Command Set (AV/C command set, defined by the 1394 trade association) to be applied, realizing simple implementation and easy operability. This protocol adopts the AV/C device model and command format for control messages and those messages are transported by the Audio/Video Control Transport Protocol (AVCTP).

In AVRCP, the controller translates the detected user action to the A/V control signal, and then transmits it to a remote BLUETOOTH enabled device. The functions available for a conventional infrared remote controller can be realized in this protocol. The remote control described in this protocol is designed specifically for A/V control only.

Dial-up Networking Profile (DUN). DUN provides a standard to access the Internet and other dial-up services over BLUETOOTH technology. The most common scenario is accessing the Internet from a laptop by dialing up on a mobile phone wirelessly. It is based on SPP and provides for relatively easy conversion of existing products through the many features that it has in common with the existing wired serial protocols for the same task. These include the AT command set specified in ETSI 07.07 and PPP.

Like other profiles built on top of SPP, the virtual serial link created by the lower layers of the BLUETOOTH protocol stack is transparent to applications using the DUN profile. Thus, the modem driver on the data-terminal device is unaware that it is communicating over BLUETOOTH technology. The application on the data-terminal device is similarly unaware that it is not connected to the gateway device by a cable. DUN describes two roles, the gateway and terminal devices. The gateway device provides network access for the terminal device. A typical configuration consists of a mobile phone acting as the gateway device for a personal computer acting as the terminal role.

General Audio/Video Distribution Profile (GAVDP). GAVDP provides the basis for A2DP and VDP, the basis of the systems designed for distributing video and audio streams using BLUETOOTH technology. GAVDP defines two roles, an initiator and an acceptor. In a typical usage scenario, a device such as a "walkman" is used as the initiator and a headset is used as the acceptor. GAVDP specifies signaling transaction procedures between two devices to set up, terminate and reconfigure streaming channels. The streaming parameters and encode/decode features are included in A2DP and VDP which depend on this profile.

In step 33, BLUETOOTH system 20 monitors the BLUETOOTH connection automatically. In this step, BLUETOOTH system 20 is in sniff mode, and power consumption is below 1 mA. A significant benefit of this system is the ability to monitor a connection while keeping power consumption to a very low level. This enables one of ordinary skill in the art to build portable devices in accordance with the present inventions that use small batteries (100-200 mAh), which can last for at least 2 or 3 weeks before being recharged or swapped. In step 34, on detection of connection drop, i.e., disconnection, BLUETOOTH system 20 attempts to reconnect in step 36. For example, when a connection is dropped while the system is in sleep mode or sniff mode, a BLUETOOTH system can automatically generate an event indicating connection drop. In the base and/or remote devices of the present invention, upon the BLUETOOTH system indicating a connection drop either the base and/or the remote will attempt to reconnect to one another or an alarm will be triggered in the base and/or the remote, as illustrated by issuance of an alarm in step 40. For a mobile phone, a connection drop is generally due to one of the followings:

The distance between BLUETOOTH system 20 and the mobile phone is too large,
There is an obstacle between the two devices. The obstacle prevents communication,
The mobile phone is powered down,
Several mobile phones are not able to support more than one active BLUETOOTH connection and drop existing BLUETOOTH connections when a user activates a new BLUETOOTH apparatus such as a headset.

To avoid problem with headsets, MFBA 10 has the following methods have been tried:

In a less preferred embodiment, when a connection drop is detected, MFBA 10 pages the user headset to see if the headset is active, and if so, the alarm will not go ON. This method is not compatible across different headsets as many headsets do not respond to paging when a call is active.

In another less preferred embodiment, when a connection drop is detected, MFBA 10 pages the mobile phone to see if the mobile phone is in the vicinity, and if so, the alarm will not go ON. This method is not compatible across different mobile phones as many mobile phones do not response to paging when a headset is active.

In another preferred embodiment, MFBA 10 runs 2 BLUETOOTH profiles simultaneously: HFP and AGHFP, and connects to PED and to headset when headset is active. This method words, voice may experience some cracking as the processor power is split over two devices.

In another preferred embodiment, MFBA 10 comprises 2 Bluetooth transceivers. One connects to PED and the other connects to headset when headset is active. This solution works well but requires a higher cost and battery consumption.

In another preferred embodiment, MFBA 10 has a sleep mode that the user can initiate by pressing activation switch 13. This mode allows MFBA 10 to sleep for a pre-determined duration, without alarm or reconnection to PED, and to resume monitoring PED after the duration is expired. This solution, although not elegant, solves the problem with headsets in a cost effective manner.

One of ordinary skill in the art will understand from the foregoing that the programming of the BLUETOOTH system can be adjusted to include instructions to reconnect and/or to trigger an alarm in accordance with the present invention. Automatic reconnection minimizes false alarms and makes the systems of the present invention more reliable and easy to use. An exemplary benefit of the automatic reconnect feature is that when a user comes within proximity of the mobile phone from out of range, the alarm automatically shuts off without requiring any additional input from the user.

In another embodiment, automatic reconnect can be used to trigger an audible alarm for indicating a paired device has come into proximity.

In an embodiment of the present inventions, the BLUETOOTH system will generate an indication or message on detection of a connection drop. For example, firmware running on a BLUETOOTH chipset, or on a virtual machine which in turn runs on a BLUETOOTH chipset, can receive or capture that disconnect indication or message. The present invention includes programming that instructs one or more responses to a disconnect indication. For example, the program will instruct a reconnection attempt and/or instruct issuance of an alarm. One of ordinary skill in the art can use market available development tools to write programming to perform the desired functions. It has been discovered by the present inventor that the disconnect event indicator is reliable for detecting that a monitored device is outside a desired range. The claimed invention has an automatic reconnect attempt feature, so that upon detection of a disconnect event, reconnection is attempted; this can avoid many false alarms. Preferably, in an embodiment, an alarm instruction is not given until at least one active reconnect attempt is made and fails. Upon the alarm issuing, periodic reconnect efforts are made, and upon reconnection the alarm will not continue. Furthermore, the claimed invention has a sleep mode that the user can initiate to prevent the alarm mode. Many PED devices on the market only allow one BLUETOOTH apparatus to be connected at any time, and this creates conflict with MFBA 10. The sleep mode allows the user to put MFBA 10 in sleep mode in order to connect other BLUETOOTH apparatus to PED for a duration of time. For example, if the user wishes to use a headset, the user can put MFBA 10 in sleep mode before using the headset. After the duration of time elapses, MFBA 10 automatically resumes operation. If the sleep mode is not ON and the user activates a Bluetooth headset, with some mobile phones, MFBA 10 may start alarm when the headset is ON and the headset operation may be interrupted due to MFBA 10 trying to reconnect.

Avoidance of false alarms makes the invention more convenient for the user.

In an embodiment, the automatic reconnection feature enables the user to locate lost keys that are connected to MFBA 10 of the present inventions. Turning the mobile phone off automatically triggers an alarm on the key chain device and helps one to locate the keys.

Referring again to the Figures, upon a monitored PED leaving a desired proximity BLUETOOTH system 20 can start a buzzer, a vibrator, or a sound system. BLUETOOTH system 20 can also activate LEDs. An example of an audible warning message could loudly state "Your phone is no longer in authorized area". In a preferred embodiment, after an alarm is issued in step 40, system 20 regularly attempts to reconnect with the monitored device.

Figure 3B:
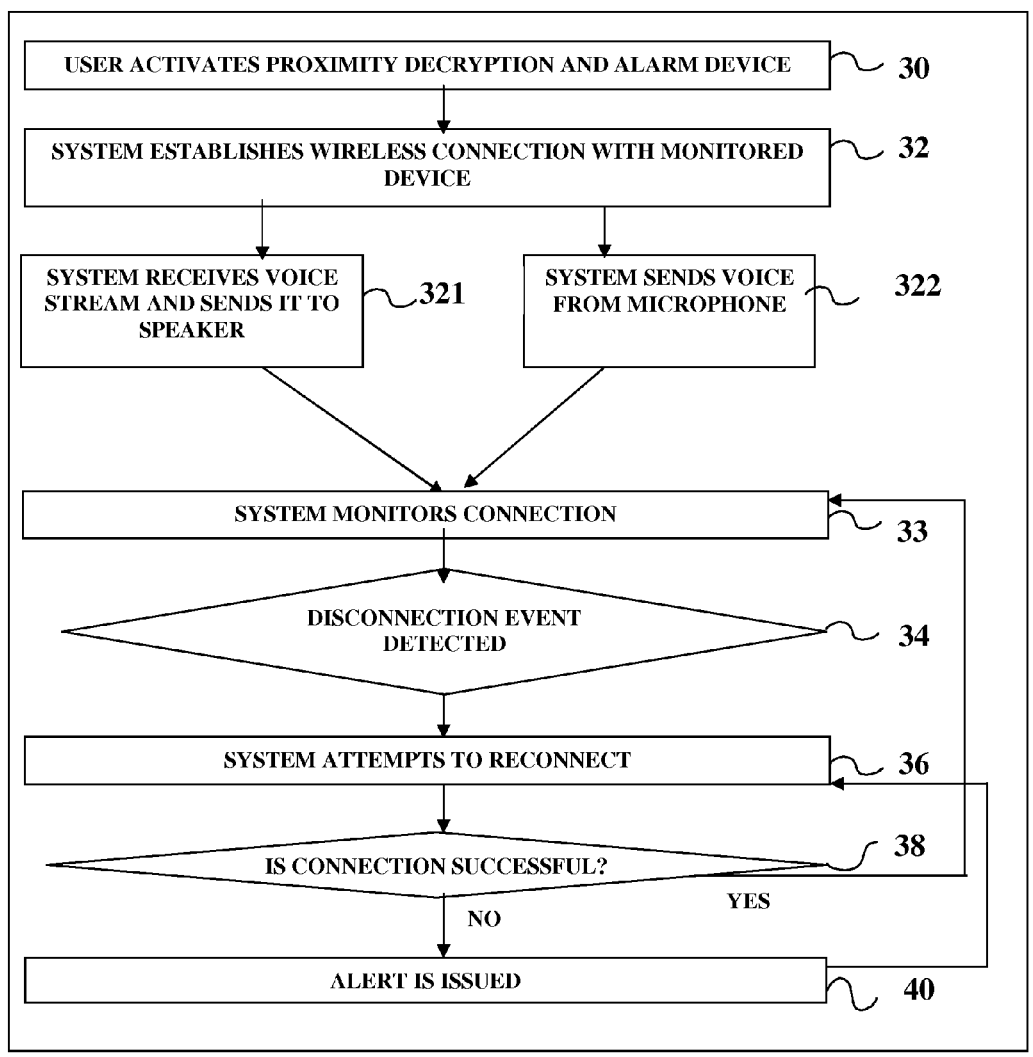
FIG. 3B is a flowchart illustrating an alternative operation of a multi-function BLUETOOTH apparatus.

Turning now to FIG. 3B, the flowchart illustrates the steps involved in detecting that a portable electronic device is outside a desired range and for transmitting or receiving voice.

Since most people prefer to limit the number of devices they carry on them, this preferred embodiment allows adding BLUETOOTH headset functionality to MFBA 11. When earpiece 27 is folded around bearing 23, the system automatically functions as a BLUETOOTH headset. When earpiece 27 is unfolded, the system is a flat device that can be carried as a key chain. The system automatically functions as a MFBA 10 key chain. When unfolded, the system may automatically function as a proximity alarm. Earpiece 27 can also pivot around bearing 23 in order to provide better fit and comfort.

This design allows the user:
To have a quick access to a BLUETOOTH headset,
To carry the BLUETOOTH headset as a keychain,
Alarm when phone is not in proximity,
System automatically reconnects when phone is in proximity, and alarm automatically shuts off,
To adjust the ear piece for better comfort,
The ear piece is shielded when not in use by inserting it in a key chain part,
The keychain can secure access to the mobile phone, and if keychain is not within proximity, the mobile phone cannot be unlocked,
The keychain can secure access to applications onboard the mobile phone, and if keychain is not within proximity, the access to the application cannot be granted.
The keychain can hold decryption keys for decrypting sensitive data onboard the mobile phone,
The keychain can hold several functions such as a Bluetooth memory, flash memory,
USB Flash drive, MP3/MP4 player, recording device, bio sensor, comb, flash light, lighter, home key, car key, firearm activation, key, Swiss knife, inter alia . . .
Most BLUETOOTH headsets on the market:
Do not have a convenient way to carry them, except by attaching them to the ear,
Have a fixed angle between the ear piece and the main body of the device,
Have a cover for the ear piece that is small and not practical. It also gets lost easily.

In another embodiment, the microphone comprises an extendable arm. The extendable arm can fold, rotate or slide. This allows for a smaller size for the main part, as well as good microphone voice capture capability.

In another embodiment, the battery is removed from the main body of the device and placed in a second part, such as a lid. This makes the BLUETOOTH headset lighter and smaller considering that a battery generally accounts for more than 60% of components volume. When inserted into the lid unit, the capacitor onboard the main body recharges.

In step 321 the system receives voice from a second device, and sends it to its onboard speaker. The second device is generally a PED such as a mobile phone. In step 322, the system sends voice from an onboard microphone to a second BLUETOOTH apparatus.

Figure 3C:
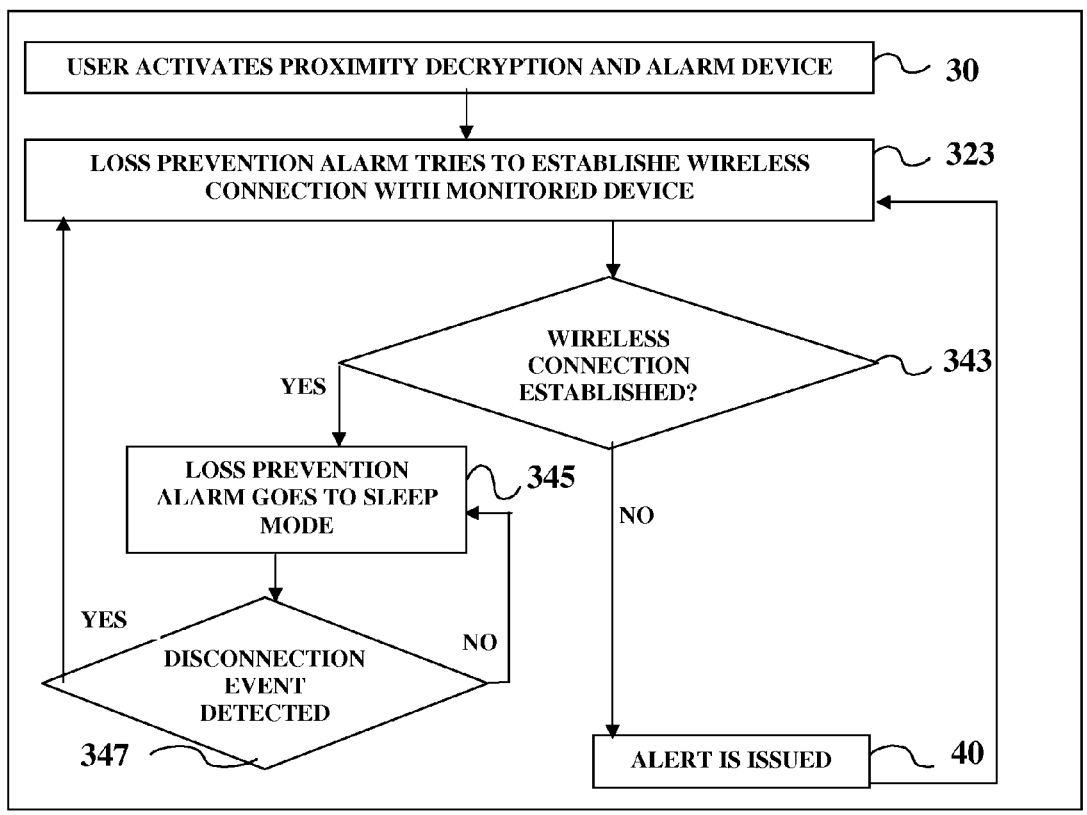
FIG. 3C is a flowchart illustrating operation of a recovery alarm.

Turning now to FIG. 3C, the flowchart illustrates the steps involved in detecting that a portable electronic device has come within desired vicinity. In step 30, the user activates MFBA 10. In step 323 the system tries to establish wireless connection with a monitored device. In step 343, if a wireless connection is not established. A periodic alert is issued in step 40. The system also periodically tries to reconnect in step 323. If a wireless connection is established in step 343, the system goes to sleep mode in step 345. In step 345, if a disconnection event is detected in step 347, the system automatically tries to re-establish the connection in step 323. If an event is detected selected from:
single button press, double button press, multiple button press,
switch activation,
voice command, sound command,
shaking device,
removing device cover,
folding device;
The system goes to sleep for a period of time selected from 30 minutes, 60 minutes, or any number of minutes.

Figure 4A:
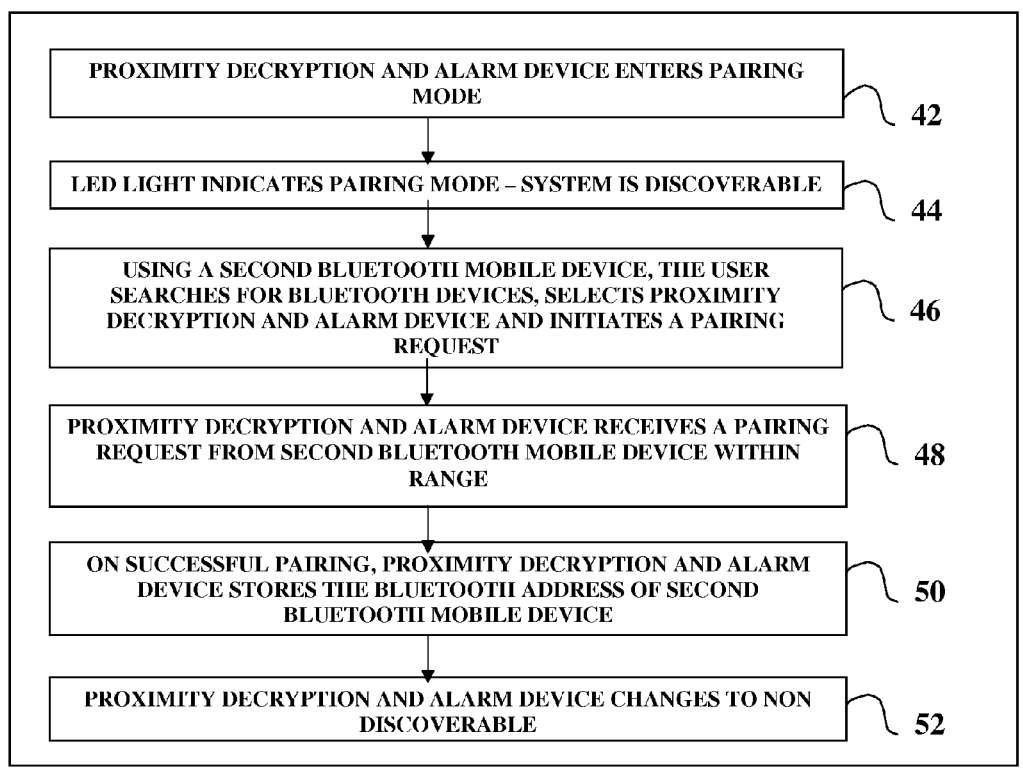
FIG. 4A is a flowchart illustrating initiating the multi-function BLUETOOTH apparatus.

Turning now to FIG. 4A, the flowchart illustrates the steps involved in initializing the MFBA 10. In step 42, multi-function BLUETOOTH apparatus 10 enters pairing mode. When it is started for the first time, multi-function BLUETOOTH apparatus 10 will be in pairing mode.

In a preferred embodiment, once MFBA 10 is paired, it becomes discoverable, and will never be able to pair again until re-flashed through communication center 25. This ensures that MFBA 10 can only be used with one or more PEDs to which it was originally paired and if lost, it cannot be used to access or decrypt data on any other PED. Also, when MFBA 10 is declared lost, it can be un-paired from its associated PED either by the user of the PED, by a network admin, or through remote admin, and therefore, the lost MFBA 10 will no longer cause any security threat. Furthermore, some programming features allow to encrypt the program onboard MFBA 10 so that a hacker cannot have access to the program, and cannot re-use it.

These methods provide for a very secure data access method, or a data decryption system and method that cannot be breached even when a MFBA 10 device is lost.

In step 44, MFBA 10 enters pairing mode. Visual indication center 16 can indicate pairing mode using a combination of LED effects, for example, alternating colored LEDs. When BLUETOOTH system 20 is set to discoverable mode, in accordance with step 46 the user uses a second BLUETOOTH PED to be monitored to search for BLUETOOTH apparatus in range and to select the MFBA 10 from the search list.

When the user initiates a pairing request, as shown in step 48, MFBA 10/11 receives a pairing request from the device to be monitored, and requests a PIN code. On successful pairing in step 50, MFBA 10 obtains the BLUETOOTH address of the device to be monitored and stores it in memory as shown by step 52. BLUETOOTH system 20 changes to non-discoverable mode and visual information center 16 changes to normal mode.

In another embodiment, after pairing, BLUETOOTH system 20 may send a file to second BLUETOOTH apparatus using OPP profile. This file can be one or more promotional files such a brochures, music, video, or application software such as a driver, a game, a client application, etc.

Figure 5:
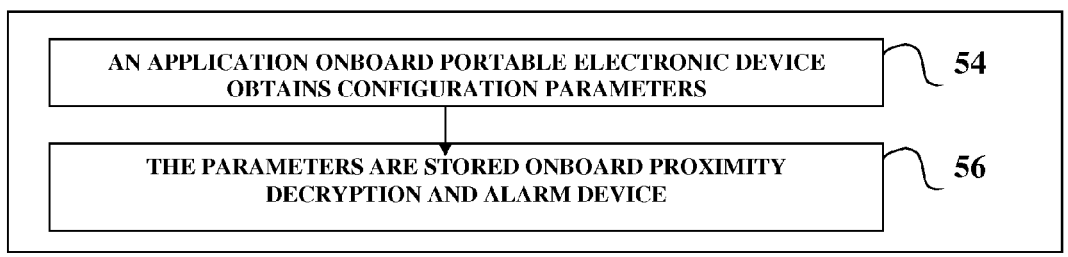
FIG. 5 is a flowchart illustrating configuring the multi-function BLUETOOTH apparatus.

Turning now to FIG. 5, the flowchart illustrates an alternative embodiment using an application onboard the monitored device. The client application is used to configure MFBA 10/11. In step 54, an application running on PED obtains configuration parameters. Configuration parameters include digital keys, passwords, as well as operation hours, operation days, buzzer type, buzzer volume, buzzer duration, range and alarm type.

MFBA 10/11 is connected to PED through an interface cable that connects USB or LPT port on the PED to communication center 25 on MFBA 10/11.

The configuration parameters can be supplied through an application or through a remote administration console and are stored or flashed onboard MFBA 10/11 in step 56 and can be used to change the properties or to program the MFBA 10.

For better security, configuration parameters are automatically compiled inside a new firmware and the new firmware is flashed to MFBA 10. The new firmware can also be encrypted or protected before being flashed on MFBA 10.

The program can install a driver, a user interface or other functionalities on PED. For example, the program can allow PED to store the address of MFBA 10 and to monitor the presence of the MFBA 10 within range. This will also allow PED to issue an alarm when MFBA leaves range. The driver can enable PED to communication with MFBA 10 and request decryption key.

Communication between MFBA 10/11 and PED can also be encrypted to protect against eavesdropping.

MFBA 10/11 can have several embodiments for each of several applications. In an embodiment, MFBA 10/11 is attached to or acts as a key chain and can be used as a PED leash. In another embodiment, MFBA 10/11 is incorporated in an RFID badge. The alarm is triggered when MFBA 10/11 is at least a predetermined distance from PED. Therefore, it can prevent the PED from being lost, forgotten or stolen. In this embodiment, the same hardware is used as in a standard BLUETOOTH headset with the addition of a buzzer. Some components such as speaker, microphone, CODEC, and volume buttons may or may not be needed. On detection of a connection drop, the device periodically attempts to reconnect, and on failure, activates an alarm. In an embodiment, the range of the device is less than about 15 meters, less than about 20 meters or less than about 4 meters.

In another embodiment, multi-function BLUETOOTH apparatus 10/11 has a PC lock insert that is used to lock the system to the side of a computer laptop or attaches to a laptop carry case. The alarm onboard multi-function BLUETOOTH apparatus 10 is triggered when the laptop is more than a predetermined distanced from a mobile phone that has a paired BLUETOOTH system. Therefore, it prevents the laptop from being lost, forgotten or stolen. Preferably the alarm is triggered when the PC and the mobile phone are less than 10 meters apart.

In another embodiment, a software running on PED consisting of: a BLUETOOTH profile, a non standard BLUETOOTH profile or an application running on PED allows establishing a connection with multi-function BLUETOOTH apparatus 10 and to trigger an alert onboard said PED on connection drop. The alert can be a ring, alert, alarm, video or voice message indicating "Your monitored device is not in your vicinity". A non standard BLUETOOTH profile is one that is not part of the profiles adopted by the BLUETOOTH Special Interest Group.

In another preferred embodiment, two MFBA 10 devices are used to secure a portable computer, as well as data on it. A first MFBA 10 is attached to the portable computer carry case and monitors distance to the owner's mobile phone, thus preventing loss or forgetting of the portable computer. A second MFBA 10 device is attached to the user's key chain or badge. It allows decryption of data based of proximity of the second MFBA 10 device (or the user that carries it) to the personal computer.

In a preferred embodiment, the software makes efficient use power consumption by controlling BLUETOOTH sleep modes. It can also perform several other functions including: Automatically log the user in the operating system security (such a Window password screen, Linux password screen, Internet web site, Internet Web 2.0 account, application access screen, database . . . ) when MFBA 10 is in proximity, and automatically log the user out when out of proximity.

In another embodiment, sensitive data onboard PED is encrypted by default and is automatically decrypted only when it is requested by the user and when MFBA 10 is in proximity. The sensitive data is decrypted using digital keys obtained wirelessly from MFBA 10. The digital keys obtained from PAAD 10 are not stored on storage device. The digital keys are also not kept in memory for future use. The digital keys are used immediately. When they are needed again in the future, they are requested from MFBA 10. This is a major differentiator over existing decryption methods which store digital keys as a global parameter for future use and which are vulnerable because the digital keys can be generated from the personal electronic device possibly through inputting/guessing of the user's password. The new invention is rooted in the physical separation of the digital key from the personal electronic device. When MFBA 10 is out of proximity, PED access is locked and application may be closed. In a preferred embodiment, the user is asked for password the first time sensitive data is requested, but after that, authentication is done wirelessly in real-time without involving the user every time the user requests access, thus the process is unobtrusive to the user.

When an unauthorized user access data on a PC or laptop, the data is found encrypted and cannot be opened unless in the absence of MFBA 10. Furthermore, viruses, Trojan Horses and spywares are ineffective when the data on the PED hard drive or solid state memory is encrypted.

In computing, real-time refers to a time frame that is very brief, appearing to be immediate. When a computer processes data in real time, it reads and handles data as it is received, producing results without delay.

BLUETOOTH ("BT") protocol includes programmable and built-in Security/authentication features and several built-in power usage modes, for example sniff mode has low-power consumption (<0.5 mA), while voice transmission can use more than 20 mA. BLUETOOTH modules are readily available on the market at a reasonable cost of around US$5 (in 2007). BLUETOOTH frequency is 2.4 GHz, similar to the frequency used in microwave ovens and close to the resonance frequency of water.

Figure 6:
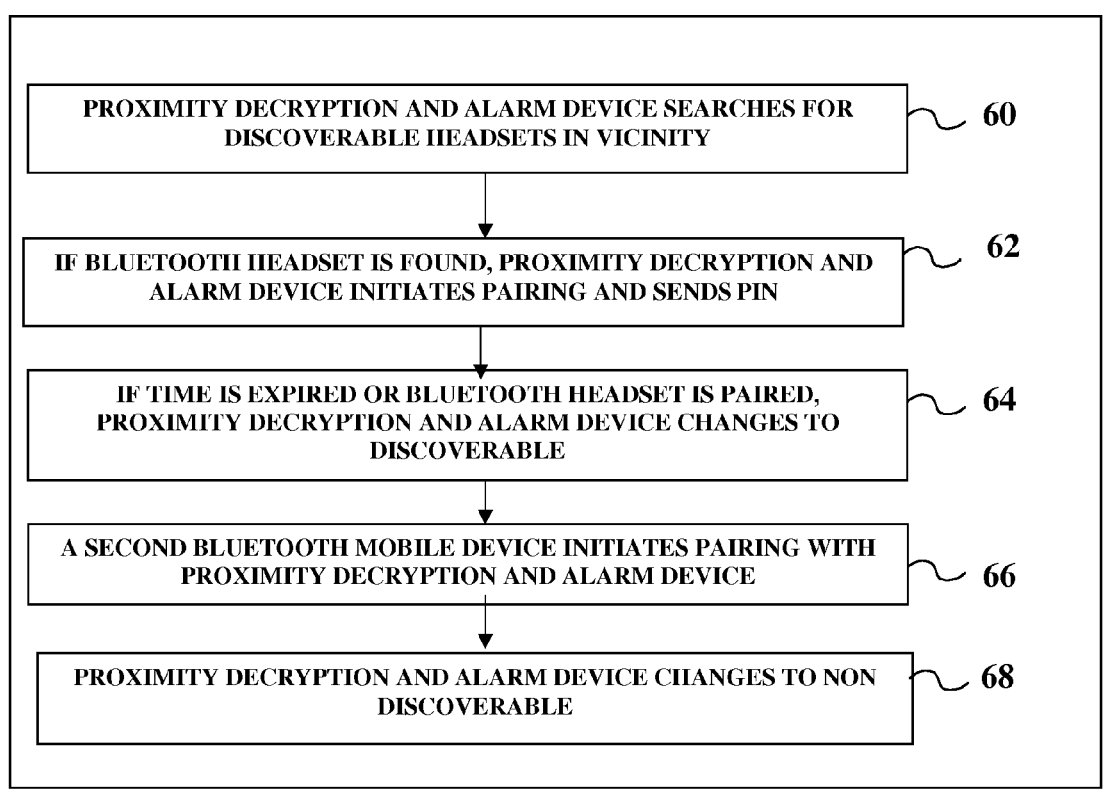
FIG. 6 is a flowchart illustrating pairing portable prevention system with a BLUETOOTH headset and a BLUETOOTH mobile device.

Turning now to FIG. 6, the flowchart illustrates pairing MFBA 10/12 with a BLUETOOTH headset and a BLUETOOTH PED.

Some mobile phones such as BLACKBERRY and IPHONE only allow one BLUETOOTH connection to be active at one time. The user cannot use MFBA 10/12 with these devices when the user activates a BLUETOOTH headset device for example. BLUETOOTH headset is any BLUETOOTH headset available on the market and capable of providing headset functionality.

In a preferred embodiment, MFBA 10/12 has a sleep mode that the user can trigger using activation switch 13 when using a headset. This allows MFBA 10/12 to cease connection to PED and to automatically resume operation after a period of time.

In another preferred embodiment, in order to address the one connection constraint of some PED, the following method is used: the BLUETOOTH headset is not paired directly with the PED. multi-function BLUETOOTH apparatus (MFBA) 10/12 automatically pairs with one or more of the user's BLUETOOTH headset by issuing a PIN code of "0000" which is used by a large majority of BLUETOOTH headsets. When a paired BLUETOOTH headset device is active, MFBA 10/12 automatically switches to relay mode, and voice streams and commands from PED are sent to/from BLUETOOTH headset. When the BLUETOOTH headset is not active, MFBA 10 monitors proximity to PED, and does not re-direct voice streams, thus voice calls are received on PED.

In step 60, multi-function BLUETOOTH apparatus (MFBA) 11 runs two BLUETOOTH profiles, HFP or HSP and AGHFP. It runs AGHFP to search for headsets in the vicinity that are discoverable for a period of time. In step 62, if MFBA 11 finds one or more discoverable headsets, it initiates pairing and sends PIN code of "0000". In step 64, if the period of time is expired or a discoverable BLUETOOTH headset is found, MFBA 11 stops the search, switches to discoverable mode, runs as HFP or HSP and waits for a pairing request from a PED. MFBA 11 may pair with multiple headsets/car kits. In step 66, a second BLUETOOTH PED such as a mobile phone initiates pairing with MFBA 11. In step 68, MFBA 11 exits pairing mode and changes to non discoverable.

Figure 7:
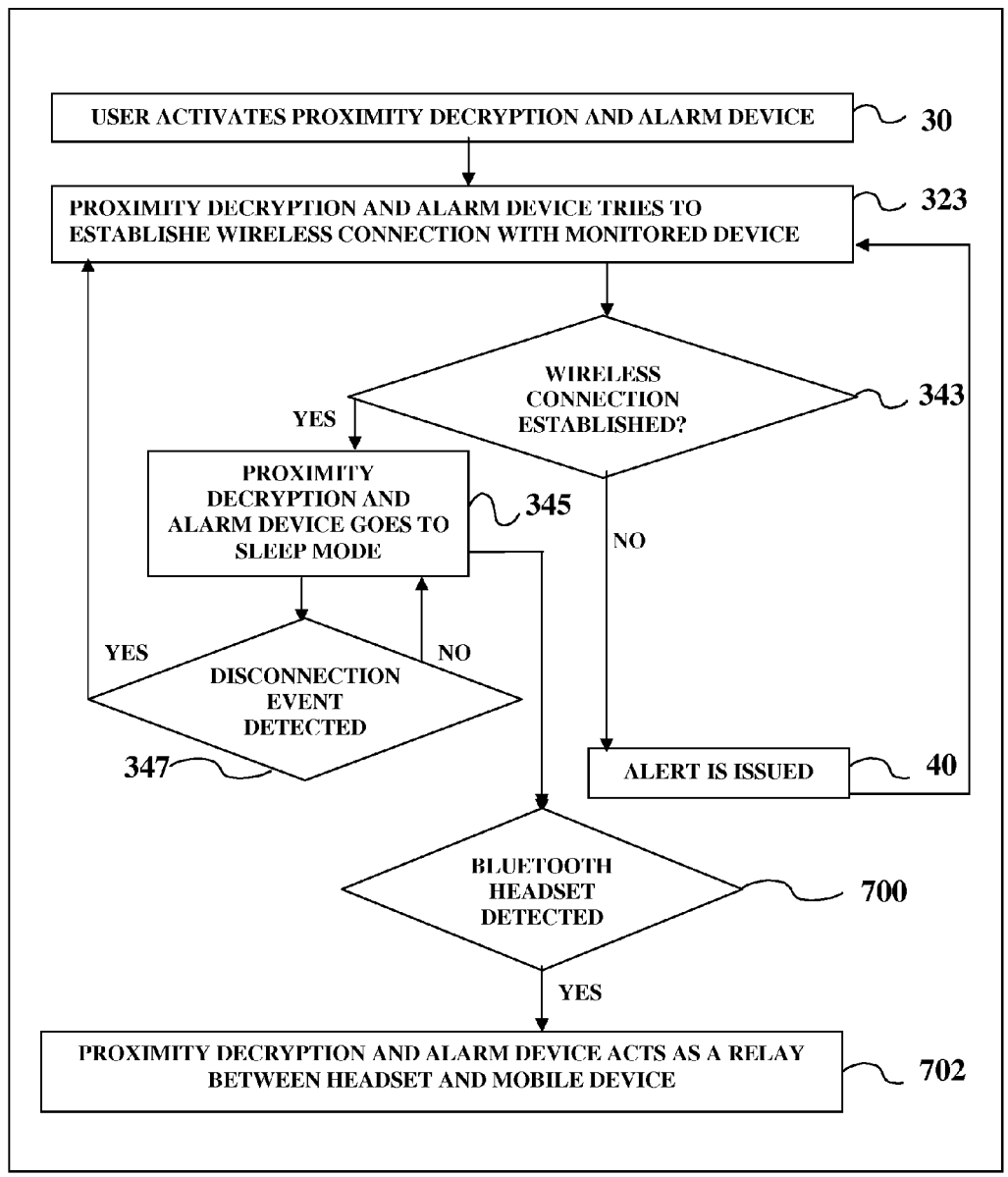
FIG. 7 is a flowchart illustrating the relay operation of a multi-function BLUETOOTH apparatus.

Turning now to FIG. 7, the flowchart illustrates an alternative embodiment whereby MFBA 10 acts as a relay.

MFBA 10 runs SPP and/or HSP/HFP and AGHFP simultaneously on the same BLUETOOTH system 20. Loss prevention 10 appears to PED as a headset (HSP/HFP) and/or SPP and monitors proximity to it while instructing it not to send or receive voice streams.

If paired with one or more BLUETOOTH headsets, MFBA 10 appears to BLUETOOTH headset as PED. In step 30, user activates MFBA 10. In step 323, MFBA 10/12 tries to establish SPP/HSP or HFP connection with monitored device. In step 343, if connection is not established, an alarm is issued and the system tries to reconnect in step 323. If a connection is established, MFBA 10 goes to sleep mode in step 345. If later a disconnection event is detected, the system tries to reconnect in step 323.

In step 700, if a connection event is detected from a paired BLUETOOTH headset through AGHFP, MFBA 10 changes mode and relays voice streams and commands programmatically between paired BLUETOOTH headset and PED in step 702. Voice streams and commands coming from BLUETOOTH headset are transferred to PED and voice streams and commands coming from PED are transferred to BLUETOOTH headset. Detecting connection event from a paired BLUETOOTH headset is a standard feature of AGHFP profile.

Turning again to FIG. 7, the flowchart illustrates an alternative embodiment whereby multi-function BLUETOOTH apparatus (MFBA) 12 acts as a relay. MFBA 12 has two BLUETOOTH systems. BLUETOOTH system 20 runs SPP and/or HSP/HFP and BLUETOOTH system 20b runs AGHFP. In this configuration, BLUETOOTH system 20 is the controller. The input voice channels from BLUETOOTH system 20 are physically connected to the output voice channels of BLUETOOTH system 20b, and the output voice channels from BLUETOOTH system 20 are physically connected to the input voice channels of BLUETOOTH system 20b.

BLUETOOTH system 20 appears to PED as a headset (HSP/HFP) and/or SPP and monitors proximity to it while instructing it not to send or receive voice streams. It alarms if the link is disconnected.

If paired with a BLUETOOTH headset, BLUETOOTH system 20b appears to the paired BLUETOOTH headsets as PED. BLUETOOTH system 20b may be in low power mode such as sniff, park, hold modes. If not paired with a BLUETOOTH headset, BLUETOOTH system 20b is powered down.

In step 30, the user activates MFBA 12. In step 323, MFBA 12 tries to establish HSP/HFP and/or SPP connection with monitored device. In step 343, if connection is not established, and alarm is issued and the system tries to reconnect in step 323. If a connection is established, MFBA 12 goes to sleep mode in step 345. If later a disconnection event is detected in step 347, the system tries to reconnect in step 323.

In step 700, if BLUETOOTH system 20b is on and it detects a connection event from a paired BLUETOOTH headset, MFBA 12 changes to a relay mode in step 702.

First, an indication is sent to BLUETOOTH system 20. BLUETOOTH system 20 and PED connect voice streams. BLUETOOTH system 20b and paired BLUETOOTH headset connect voice streams. Since BLUETOOTH system 20 and BLUETOOTH system 20b are connected through wiring, voice streams and commands flow between paired BLUETOOTH headset and PED, through BLUETOOTH system 20 and BLUETOOTH system 20b.

The present invention also secures content onboard the portable electronic device. It presents a comprehensive solution that ensures that content is protected to a maximum level, and cannot be tempered with. This solution involves minimum effort on the part of the user, and ensures minimum risk of exposure in case of a theft of a personal electronic device or a multi-function BLUETOOTH apparatus occurs.

Public-key infrastructure (PKI) ensures that people are who they say they are and also proves that documents haven't been tampered with.

PKI uses extremely long prime numbers, called keys. Two keys are involved—a Private Key, which the owner of the information has access to, and a Public Key, which can be accessed by anyone. The two keys work together, so a message scrambled with the Private Key can only be unscrambled with the Public Key and vice versa. The more digits in these keys, the more secure the process.

A large piece of data set to be encoded—for instance, a document—is run through a complicated mathematical computation to generate a single large number, called a hash. The original data and the hash are inextricably linked. If either changes, the hash won't match. Any entity can verify the validity of the document by checking a stored hash against a hash computed from the data. If the hashes match, the data was not tampered with.

Since the present invention seeks to protect PED as well as data onboard PED, Public Key infrastructure (PKI) is used to generate a set of Public Key and Private Key unique for each user. A multi-function BLUETOOTH apparatus (MFBA) 10 is assigned to each user for storing the Public Key (or alternatively the Private Key), and an application/driver/program/ chipset/plug-in/file manager/data base manager containing the Private Key (or alternatively the Public Key) is installed on the user PED.

Sensitive data on PED storage medium (hard drive, solid state memory, Flash, network drive, CD Rom, Zip drive, Bluetooth drive) is kept encrypted at all time, using Private Key (or alternatively the Public Key). A hash may be generated and stored every time the data is updated.

On user request to read data, a request is made to MFBA 10 to get the Public Key, and the requested data is decrypted using the key. The requested data is presented through an authorized application. The hash may be generated again and compared with the stored hash key to ensure the data has not been tempered with On user request to update/save/write sensitive data on storage medium, if the user is granted write privilege, data is automatically encrypted using the Private Key and written to storage medium. The hash key is regenerated and stored.

In case the PED is stolen, PED is lost, a Trojan Horse is installed onboard PED, a virus/impostor/unauthorized user tries to access the data onboard PED, the sensitive data will be encrypted and will be very difficult to decrypt.

In case MFBA 10 is lost or stolen without associated PED, it cannot be used with any other PED. It is indiscoverable, and cannot be set to pairing mode again. The firmware onboard is encrypted and cannot be tempered with. Furthermore, when the owner of the lost of stolen MFBA 10 report the lost or stolen device, the administrator (or the user) can:

Pull the old Public Key from a safe place,
Assign a new MFBA 10 (with a new BLUETOOTH ID),
Put the old Public Key on the new MFBA 10 (by flashing it through communication center 25),
Un-pair PED from the old MFBA 10, (this can be done either on the PED, or by remote accessing the PED)
Send the new MFBA 10 to the user,
Pair PED with the new MFBA 10, (this can be done by activating MFBA 10, and entering PIN code on PED)
Since the old MFBA 10 is unpaired from PED, the user of the old MFBA 10 will not be able to use it with associated PED.

However, since the user Public Key is stored on the lost/stolen MFBA 10, it is a better procedure to also:

Assign a new Public Key and Private Key to the user,
Store the new Public Key on the new MFBA 10, (by flashing it through communication center 25)
Decrypt all previously encrypted data using old Public Key, and encrypt is again using the new Public Key before storing it onboard PED.

In case the PED and MFBA 10 are stolen together, the sensitive data may be compromised unless further security is built such as the followings:

On first time the user requests access to sensitive data during a user session, a user password (master password) is requested for authentication. Later in the session, when authentication is requested, MFBA 10 is contacted. This reduces annoyance to the user.

On first time every accessing sensitive data, the user is asked for a master password, and a matching private key (alternatively public key) is generated and stored onboard PED. This private key will be used to validate user password.

For added security, PED connects automatically to a remote server (periodically or at random intervals) and collects messages. If remote server indicates breach of security, said PED deletes the private keys. Also, if connection to remote server is not possible, the user is given a deadline to enable connection. If the deadline is passed and the connection is not provided, PED deletes the private key.

In another embodiment, the public key onboard MFBA 10 is further encrypted. The encryption may use a password, a second public key private key method, or any other method. This protects the integrity of the public key in case the wireless connection is breached, or in case a hacker sniffs the packets. In this method, the network admin will supply the user with a short password (public key 2) that is needed to decrypt the first public key. The user will be instructed to enter the short password as part of his/her master password.

In another embodiment, MFBA 10 also has an algorithm that generates passwords that change with time, and that are in synch with server based passwords. This is similar to SECUREID, but the advantage is that the user is spared the effort of reading the key and typing it on PED. Instead, the key read from MFBA 10 is input automatically. This enables better security as first, authorization can be performed often without concerns for user discomfort, second, the keys stores on MFBA 10 can be much longer than those memorized by a user, thus more secured, third, the keys stored on MFBA 10 are not vulnerable to Trojan Horses and to spying eyes.

These methods provide for a very secure data access system consisting of a decryption system and method that cannot be breached even when a MFBA 10 device is lost.

In a preferred embodiment, once MFBA 10 is paired, it becomes discoverable, and will never be able to pair again until re-flashed through communication center 25. This ensures that MFBA 10 can only be used with one or more PEDs to which it was originally paired and if lost, it cannot be used to access or decrypt data on any other PED. Also, when MFBA 10 is declared lost, it can be un-paired from its associated PED either by the user of the PED, by a network admin, or through remote admin, and therefore, the lost MFBA 10 will no longer cause any security threat. Furthermore, some programming features allow to encrypt the program onboard MFBA 10 so that a hacker cannot have access to the program, and cannot re-use it.

The program that runs on PED and that enforces security together with MFBA 10 can be a driver, an EXE, an API, a COM, a JAVA program, can be integrated in an application, in a database, in a browser, in a file manager, in the operating system and can be built into a chipset, and put next to the CPU or to the hard-drive device manager.

In another preferred embodiment, 2 MFBA 10 devices are used to secure a PED and data onboard. A first MFBA 10 is carried by the user as a keychain or badge, and is used to authenticate access to data (and decrypt data) onboard PED based on user proximity to PED. A second MFBA 10 is attached to PED carry case, and is used to monitor proximity to first MFBA 10, and alarm when said proximity is breached.

Figure 8:
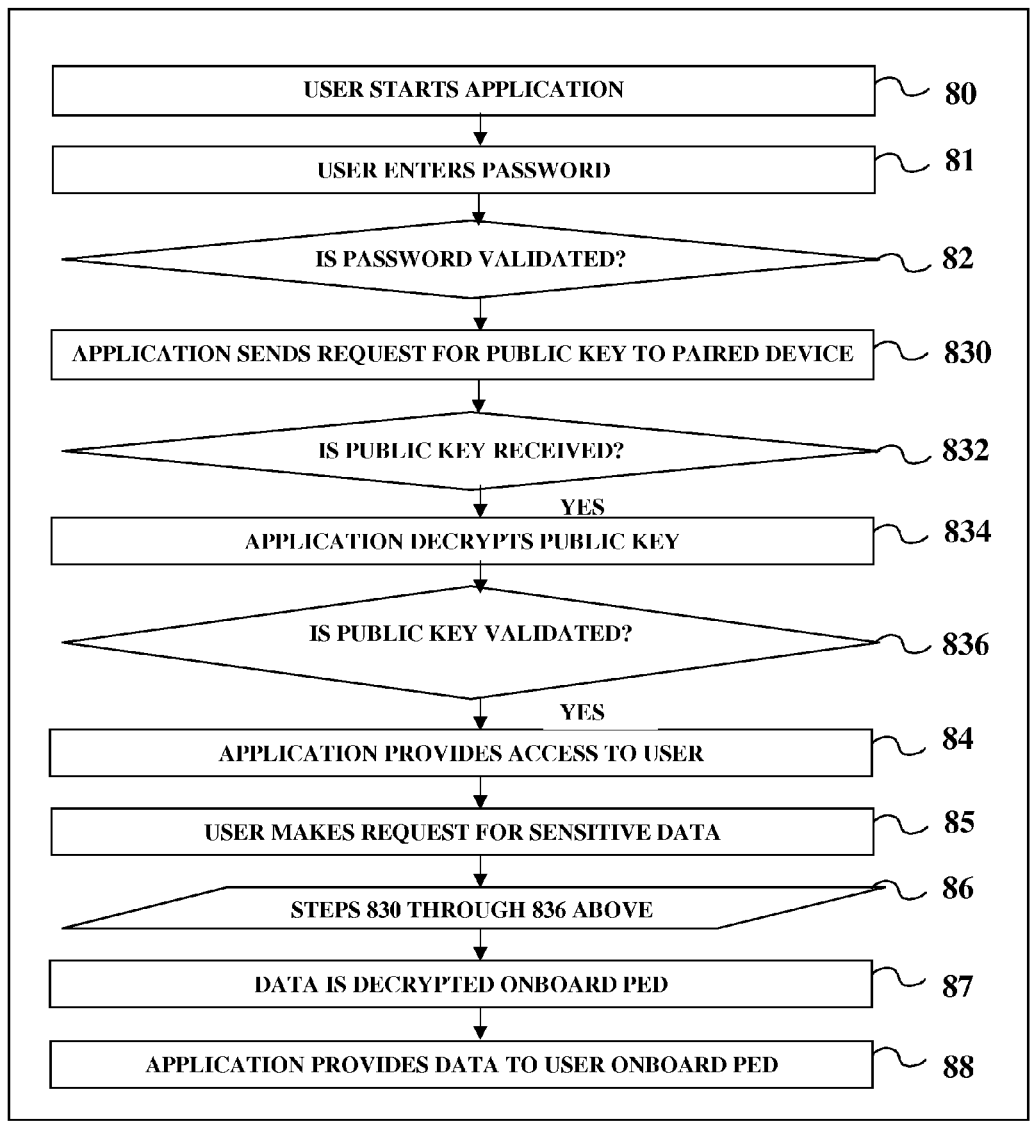
FIG. 8 is a flowchart illustrating an alternative embodiment for providing secure access to sensitive data.

Turning now to FIG. 8, the flowchart illustrates an alternative embodiment for providing secure access to sensitive data.

The user starts an application to access sensitive data in step 80. The user enters a password in step 81 and if validated in step 82, PED established a Bluetooth wireless 2-way link with MFBA, and the application sends a request to paired device in step 830 to provide public key. If the public key is returned in step 832, the application may decrypt the public key in step 832. The application may use part or the entire user password or any other information in order to decrypt the public key in step 834. If public key is authenticated in step 836, the application provides access to user in step 84. The application may provide the user with menus, user interface, selection criteria, information to choose from, etc.

In step 85, the user makes a request for sensitive data. Steps 830 through 836 are repeated for every request. The application requests the public key from MFBA 10, the application may decrypt the public key, and validate it. In step 87, the public key is used it to decrypt data onboard PED and in step 88, the data is provided to the user. Traditionally, the data is decrypted in small pieces at a time, and the small pieces are kept in memory RAM and not written to long term storage.

Figure 9:
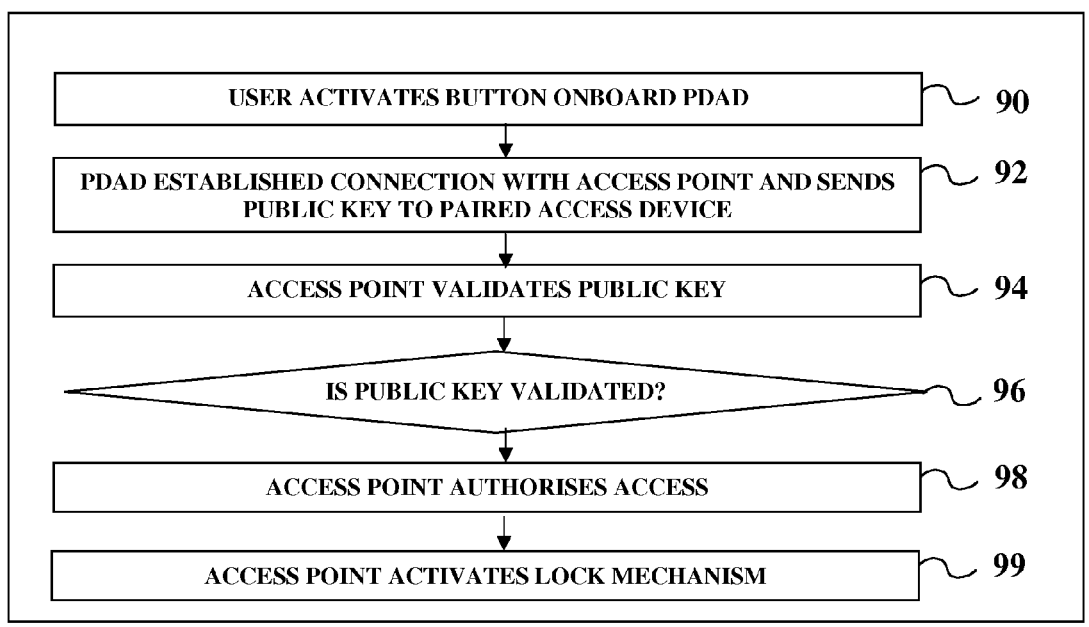
FIG. 9 is a flowchart illustrating the operation of a Bluetooth key.

Turning to FIG. 9, the flowchart illustrates the operation of a Bluetooth key. In step 90, a user activates a button onboard MFBA 10. In step 92, MFBA 10 established a Bluetooth connection with access point. Access point may be any door, lock, vault . . . In step 94, the access point validates the public key. If validated in step 96, access point authorizes access in step 98 and activates lock mechanism in step 99.

Figure 10:
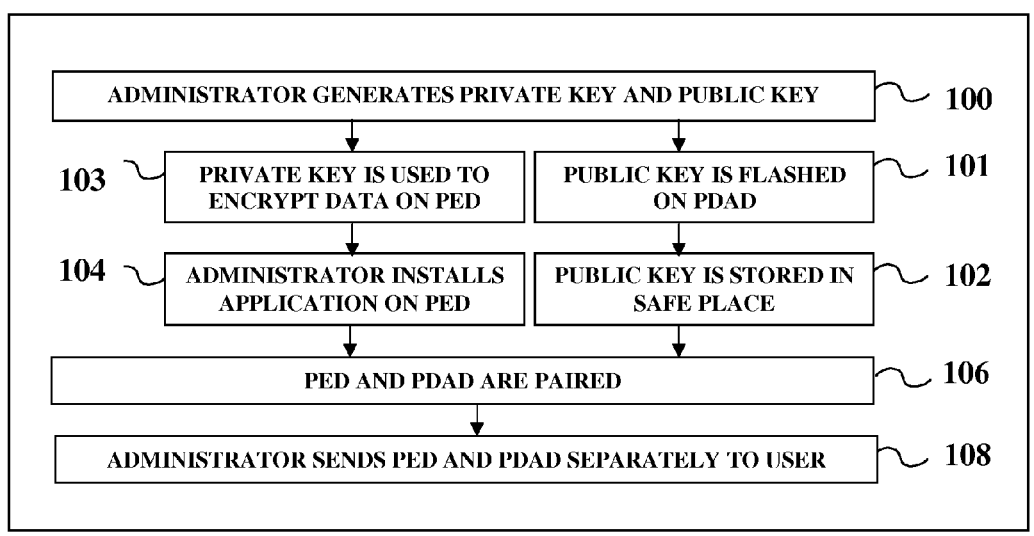
FIG. 10 is a flowchart illustrating an embodiment for setting up the system.

Turning now to FIG. 10, the flowchart illustrates an embodiment for setting up MFBA 10 and associated PEDs.

The administrator generates a set of unique private key and public key for a user in step 100. The administrator can be a person or au automatic program. The public key is flashed on MFBA 10 in step 101, and then stored in a safe place in step 102. The private key is fed to an application onboard PED, and used to encrypt sensitive data that is installed on PED in step 103. The private key is also used to encrypt information that is sent to PED, either through network download, email, flash drive, CD, DVD, or any other means. The administrator may install an application on PED to view the sensitive data in step 104. The PED and MFBA 10 are paired in step 106. The PED and associated MFBA 10 are transferred to the final user in step 108. Traditionally, The PED and MFBA are sent separately.

Several keys may be stored on MFBA 10. These keys can be used to access multiple secured applications or multiple data within an application. Different keys can also govern different access privileges such as read, write, delete, modify for different pieces of data.

If the user requires access to more than one PED, the public keys for all those computers are flashed on MFBA 10, also, MFBA 10 is paired to all PEDs.

On the user accessing the sensitive data for the first time, a new password is requested. The application onboard PED will generate a hash for the password, and will store the hash onboard PED.

For instance, the password is run through a mathematical computation to generate a single number, called a hash. The original data and the hash are inextricably linked. If either changes, the hash won't match. Any entity can verify the validity of the password by checking a stored hash against a hash computed from the password. If the hashes match, the password is valid.

The first time the user request access to sensitive data, the application must validate the user password. The application creates a Bluetooth secured link or connection with MFBA 10, for example, an SPP connection, and HFP/HSP connection, or any other type of Bluetooth connection. Next, every time the user requests a piece of data, the application will request the one or more public keys from MFBA 10, and will use them to decrypt the requested piece of data. If the data requested is too large, the application may provide the use with a maximum size of data. This process allows to only decrypt the piece of data that the user needs and to keep the rest of sensitive data encrypted. A piece of data can be for example n MB, n records, n packets, n frames, or any finite set of data. "n" can be for example, 0.1, 1, 10, 100, 1000, 100000, or any other value.

This enables real-time functionality because the work that the application must do is time-bound, i.e. the application can guarantee a specific maximum response time.

This also allows securing the data as much as possible against abuse, spying, viruses and Trojan horses which are not able to make use of encrypted data.

The public key is stored on a device that is on the user most of the time, such as a badge or a key chain, thus reducing the risk of theft of the key if the PED is stolen. This is in contrast to a USB key which must be kept with the PED when it is used, and can be stolen with it.

Since the public key can be accessed in real-time, the key is never kept on disk, and generally, is quickly removed from RAM by over-writing it or deleting it. Short of that, the program can write several bogus and random keys to memory so that is worse comes to worse, and a hacker is scanning the memory for keys, he/she would not be able to zoom on the one key, instead, the keys would not stand out in the memory dump. If the hacker manages to find the keys, he/she would not know which one is good. This is in contrast to decryption/encryption solutions that use a password, and which require that the password/key is kept in RAM for the whole session, so that when the user leaves the session, the password/key is automatically used to encrypt the data. If the key is not in memory at the end of the session, these systems risk not being able to encrypt the data.

When the user request data, the hash key for the data is validated to ensure the data has not been tempered with.

In a preferred embodiment, the data is decrypted in RAM, and is not written to storage. Storage is either disk, flash or any solid-state memory or long term memory. Since some operating system use virtual memory on storage, and swap data between RAM and storage, the application can also monitor user proximity, and clear memory and virtual memory when the user leaves vicinity. The application monitors connection with MFBA 10, detects connection drop and automatically closes and may cause a large amount of data to be put in memory to erase any trace of the data.

In a proximity alarm mode, the application my sound an alarm when connection is dropped.

In the scenario where MFBA 10 is lost or stolen, a thief will not be able to use MFBA 10 with other PC except the ones it was paired with.

As the administrator is informed of the problem, first, lost of stolen MFBA 10 must be unpaired from associated PEDs. This is done through Windows, and can also be done remotely. The network admin will then generate a new set of private key and public key for the user with lost MFBA 10. The old public key is pulled from the safe place. A script using the old public key and the new private key will decrypt the data on PED and encrypt it using the new private key. The new public key is flashed on MFBA 10, stored in a safe place, and the MFBA 10 is shipped to the user.

If PED is stolen or lost, the sensitive data onboard will be encrypted. If a thief steals the hard drive, the data will still be encrypted.

This is in contrast with some of the current methods that decrypt all data onboard a PED, which means that the decrypted data has to be store.

In another preferred embodiment, we combine a physical key with public key/private key security with headset functionality to provide the next generation key that not only opens doors (car door, home door, garage door, vault door), but also provides headset voice capability. The motivation behind this is:

1—Users want do not want to carry any extra devices besides car key and mobile phone.
2—Cars nowadays offer voice solutions when the user is inside the car, and it would be more interesting for them to provide and total solution, regardless of where the user is.
3—Cars keys are becoming a small electronic device with the event of RFID.
4—Most drivers use mobile phones.

5—Most drivers need or will need to comply with hands free legislation.
6—Users should have their keys and their mobile phone in proximity most of the time.
7—More importantly, most people that use a remote control for unlocking a car, have to first press a button onboard the remote control, then pull the door handle. These 2 steps can be merged by just doing one step, that of pulling the door handle. The handle should be able to automatically authenticate the key, and allow access. In other terms, access is only granted if MFBA 10 is in proximity. The value here is that we remove unnecessary steps or actions.

If one of them is not, the user may be on the brink of loosing either one. Having a buzzer on the key to alarm when the mobile phone is not in proximity of the mobile phone allows to not only monitoring the mobile phone, but may help in locating the keys (by turning Bluetooth off onboard the mobile phone, the buzzer onboard the keys should start alarming).

7—MFBA 10 can be used to authenticate access to the mobile phone interface or data therein.

FIG. 1B describes integrating a key chain (car key in this instance) with a headset piece. In a preferred embodiment, the headset piece is rotating so that the key can be flat when it is not inserted in the ear, and can have the shape of a headset when folded. In another embodiment, the user users a wire speaker to connect to the key chain.

MFBA 11 is carried by the user and is used to provide secure access based on proximity and public key private key authenticate.

Each MFBA 11 has a unique private key. When user requests access, the unique private key is transmitted to paired device in the vicinity. The paired device then authenticates the public key with the onboard private key. If a match is found, the paired device automatically unlocks or automatically triggers and unlocking mechanism.

Further, for more security, the user may provide biographic authentication such as be not limited to voice recognition, password entry, retinal scan, finger print, or other information.

In another embodiment, the public key onboard MFBA 11 is further encrypted using another public key private key layer. This protects the integrity of the public key in case the wireless connection is breached, or in case a hacker sniffs the packets. The user may provide biographic authentication through voice recognition, password entry, retinal scan, finger print, or other information which may be used to decrypt the public key.

When proximity from MFBA is breached, several actions may be performed such as automatically locking the door, running algorithms, obtaining GPS position from an onboard GPS receiver (or a combined Bluetooth/GPS receiver) and storing it for directing the user to the car in case the user forgets where the car is. MFBA 11 can perform actions while proximity is maintained such as periodically getting a car GPS position for directing the user to the car in case the user forgets where the car is. In a preferred embodiment, on user turning the engine off, or putting the car in park mode, the vehicle onboard computer automatically sends the last GPS position information to MFBA 11. On receipt of the GPS position information, MFBA 11 stores the vehicle position information. Later, if the user requires assistance locating the parked vehicle, the user launches an application onboard PED. The application obtains new GPS position information and heading of the user. The application obtains the vehicle position information from MFBA 11. The application uses the user position information and heading and the vehicle position information to display a heading and distance to the parked vehicle.

Since most people carry a wallet, a mobile phone and keys, MFBA 11 provides a user with valuable all in one features and at the same time does not require the user to carry and extra device, all this thanks to Bluetooth. The features include:
Proximity alarm for mobile phone
Headset for mobile phone
Locator for parked vehicle
Vehicle keys
Door keys The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:
1. A method for authorizing user access comprising:
pairing with a unitary apparatus containing a single transceiver in a first range,
wherein said single transceiver is selected from the group consisting of a BLUETOOTH transceiver and a Wibree transceiver,
wherein upon a user performing actions selected from the group consisting of:
activating a personal electronic device,
launching an application onboard a personal electronic device,
pressing a button onboard a personal electronic device,
activating a switch onboard a personal electronic device,
touching a screen onboard a personal electronic device,
opening a file onboard a personal electronic device,
accessing data onboard a personal electronic device,
pulling a door handle connected to a personal electronic device,
pushing an engine start button connected to a personal electronic device,
pushing a safety lock connected to a personal electronic device,
pushing a trigger onboard a personal electronic device, and,
pulling a trigger onboard a personal electronic device,
said personal electronic device wirelessly authenticates said unitary apparatus, whereby said authenticating of said unitary apparatus comprises performing actions selected from the group consisting of:
- said personal electronic device establishing a secure two-way wireless connection with said unitary apparatus,
- said personal electronic device paging said unitary apparatus and receiving a response,
- said personal electronic device performing a Bluetooth inquiry and verifying said unitary apparatus responds,
- said personal electronic device verifying said unitary apparatus is within vicinity,
- said personal electronic device requesting a digital key from said unitary apparatus and verifying said digital key is valid, and
- said personal electronic device requesting a digital key from said unitary apparatus and verifying said digital key matches a private key, wherein upon successful authentication,
- performing actions selected from the group consisting of:
  - enabling user access, decrypting a file, launching an application, unlocking a phone, unlocking a screen, unlocking a file, unlocking a door, activating a mechanical apparatus, unlocking a mechanical apparatus, triggering a mechanical apparatus, starting an engine, and activating a relay.

2. The method of claim 1 whereby:

upon detection of a connection drop,
- said personal electronic system automatically performs actions selected from the group consisting of:
  - disabling a user access, locking a phone, locking a screen, locking a file, locking a door, encrypting a file, closing an application, deactivating a mechanical apparatus, locking a mechanical apparatus, and activating a relay, powering off.

3. The method of claim 1 whereby:

said personal electronic device automatically locks after a period of time.

4. A method for monitoring an electronic system and for locating a parked vehicle comprising:
- pairing said electronic system with a single transceiver apparatus wherein said single transceiver is selected from the group consisting of a BLUETOOTH transceiver and a Wibree transceiver,
- establishing a secure two-way wireless connection between said electronic system and said single transceiver apparatus,
- wherein upon said single transceiver apparatus detecting a connection drop from said electronic system,
  - said single transceiver periodically attempts to reconnect to said electronic system,
- wherein upon said electronic system detecting events selected from the group consisting of:
  - a vehicle is parked, a vehicle engine is turned off, and a vehicle door is opened,
- said electronic system automatically
  - obtains position information corresponding to the parked vehicle location from a GPS system onboard said vehicle, and
  - transmits said position information corresponding to the parked vehicle location to said single transceiver apparatus,
- wherein upon receipt of said position information corresponding to the parked vehicle location, said single transceiver apparatus automatically stores said position information corresponding to the parked vehicle location.

5. The method of claim 4 whereby:

upon a portable locator apparatus receiving a user request for locating the vehicle,
- said portable locator apparatus obtains a first position information from said single transceiver apparatus corresponding to the parked vehicle location,
- said portable locator apparatus obtains a second position information from an onboard GPS system corresponding to current location,
- said portable locator apparatus obtains the current bearing information,
- said portable locator apparatus compares said second position information and bearing with said first position information, and determines bearing and distance to the parked vehicle location.

* * * * *